(12) United States Patent
Lee et al.

(10) Patent No.: US 12,386,558 B2
(45) Date of Patent: Aug. 12, 2025

(54) STORAGE DEVICE PERFORMING ATOMIC WRITE, HOST CONTROLLING STORAGE DEVICE, AND OPERATING METHOD OF STORAGE DEVICE

(71) Applicant: SAMSUNG ELECTRONICS CO., LTD., Suwon-si (KR)

(72) Inventors: Yongmyung Lee, Suwon-si (KR); Seokhwan Kim, Suwon-si (KR); Daejun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 18/243,923

(22) Filed: Sep. 8, 2023

(65) Prior Publication Data
US 2024/0201898 A1  Jun. 20, 2024

(30) Foreign Application Priority Data
Dec. 20, 2022 (KR) .......................... 10-2022-0179739

(51) Int. Cl.
*G06F 3/06* (2006.01)

(52) U.S. Cl.
CPC .......... *G06F 3/0659* (2013.01); *G06F 3/0604* (2013.01); *G06F 3/0683* (2013.01)

(58) Field of Classification Search
CPC ...... G06F 3/0604; G06F 3/0607; G06F 3/061; G06F 3/0656; G06F 3/0658;
(Continued)

(56) References Cited

U.S. PATENT DOCUMENTS

| 7,613,698 B2 | 11/2009 | Verma et al. |
| 9,672,245 B2 | 6/2017 | Lee et al. |

(Continued)

FOREIGN PATENT DOCUMENTS

| CN | 111506458 A | 8/2020 |
| CN | 112764685 A | 5/2021 |
| KR | 10-2022-0020143 A | 2/2022 |

OTHER PUBLICATIONS

Yongmyung Lee, et al., "When F2FS Meets Address Remapping", HotStorage '22, Jun. 27, 2022, Virtual Event, pp. 31-36 (Total 6 pages).

(Continued)

*Primary Examiner* — Aracelis Ruiz
(74) *Attorney, Agent, or Firm* — Sughrue Mion, PLLC

(57) ABSTRACT

A storage device includes a non-volatile memory; a volatile memory; and a storage controller configured to: receive a new data and append data write command from a host, write new data and append data to at least one of the non-volatile memory and the volatile memory, receive, from the host, a remap command including mapping information between old data and the new data and a first identification (ID), based on the remap command, store in the volatile memory the mapping information between the old data and the new data and the first ID, receive, from the host, a metadata write command requesting writing meta data for the append data and including the first ID, and based on the metadata write command, update the mapping information between the old data and the new data, and write metadata related to the append data to the non-volatile memory.

20 Claims, 19 Drawing Sheets

(58) Field of Classification Search
CPC .... G06F 3/0659; G06F 3/0665; G06F 3/0679; G06F 3/0683; G06F 12/0292
See application file for complete search history.

(56) References Cited

U.S. PATENT DOCUMENTS

| | | |
|---|---|---|
| 9,977,626 B2 | 5/2018 | Sampathkumar et al. |
| 10,254,983 B2 | 4/2019 | Tomlin et al. |
| 10,445,000 B2 | 10/2019 | De Jong et al. |
| 10,642,531 B2 | 5/2020 | Song et al. |
| 10,915,267 B2 | 2/2021 | Trika et al. |
| 11,372,543 B2* | 6/2022 | Benisty ................ G06F 3/0688 |
| 11,561,723 B2 | 1/2023 | Jeon et al. |
| 2016/0085796 A1* | 3/2016 | Ki ........................ G06F 3/0643 707/695 |
| 2017/0185350 A1 | 6/2017 | Waidhofer et al. |
| 2017/0185354 A1 | 6/2017 | Doshi et al. |
| 2022/0027325 A1* | 1/2022 | Nuttle ................ G06F 16/1805 |

OTHER PUBLICATIONS

Hongwei Qin, et al., "Better Atomic Writes by Exposing the Flash Out-of-Band Area to File Systems", LCTES '21, Jun. 22, 2021, Virtual Event, pp. 12-23.

* cited by examiner

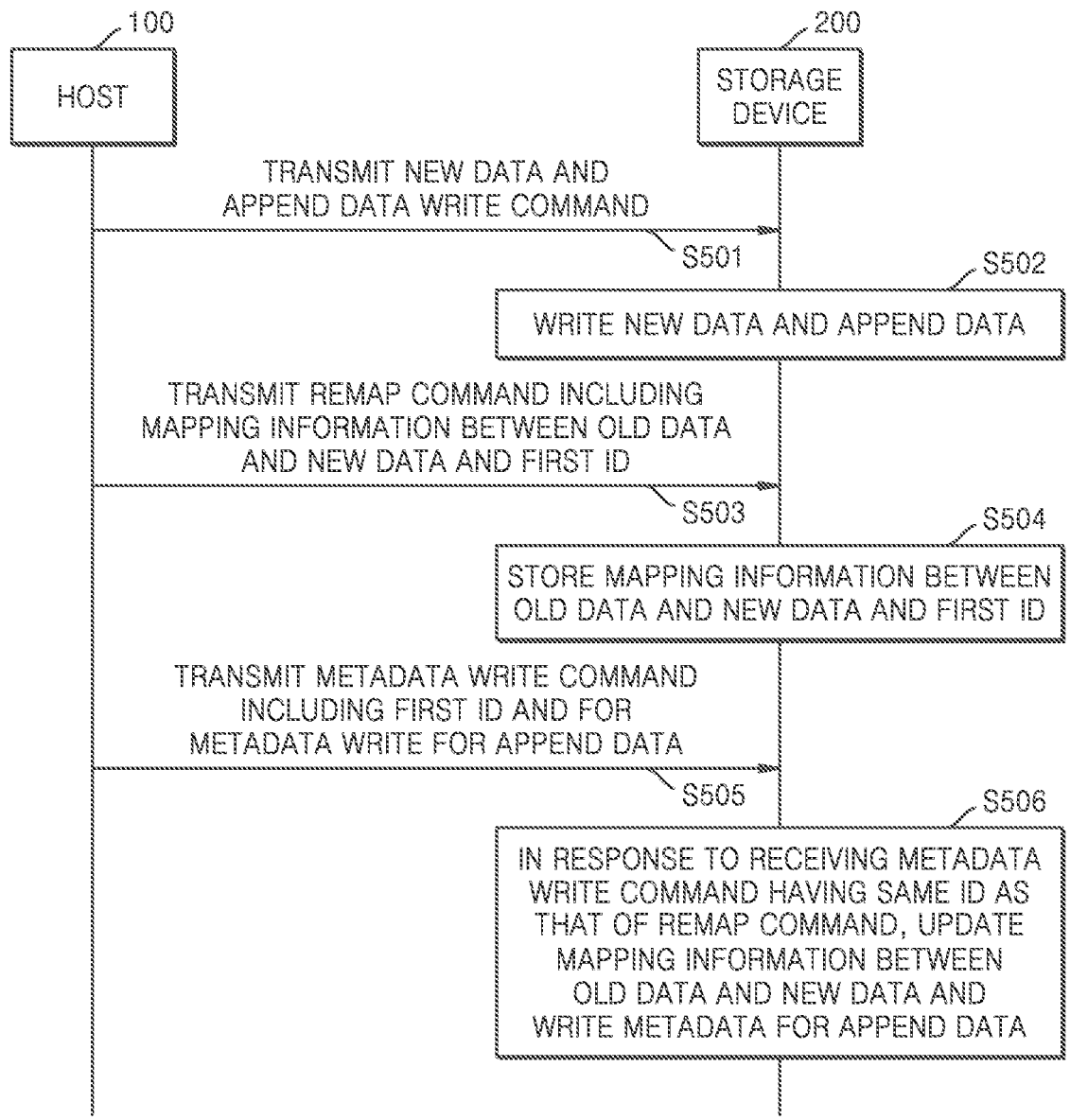

FIG. 6B

| | | | | |
|---|---|---|---|---|
| Old data Segment(40) | D0 #12 | D1 #13 | D2 #14 | D3 #15 |
| New data Segment(41) | D1' #80 | D3' #81 | | |
| Append data Segment(42) | D4 #100 | | | |
| Metadata Segment(43) | N0 #150 | N0' #151 | ... | |

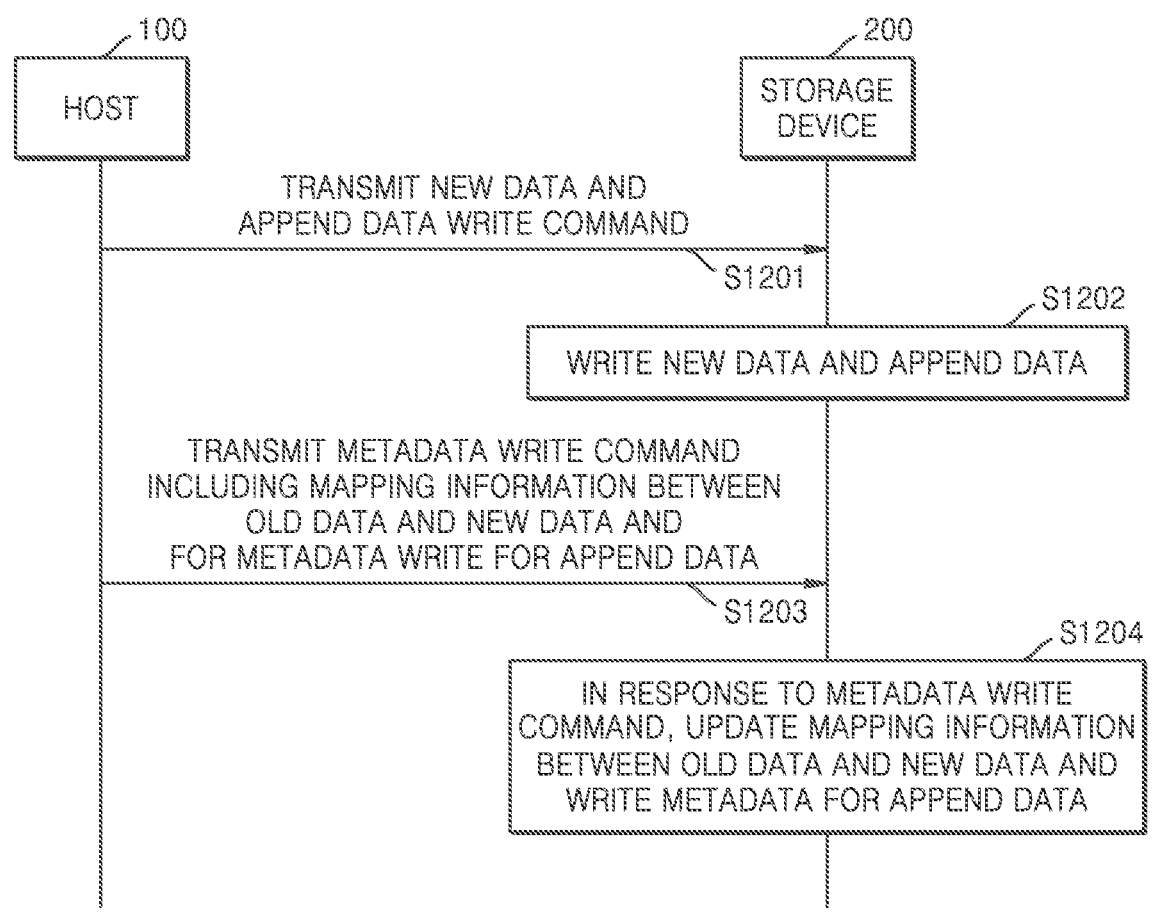

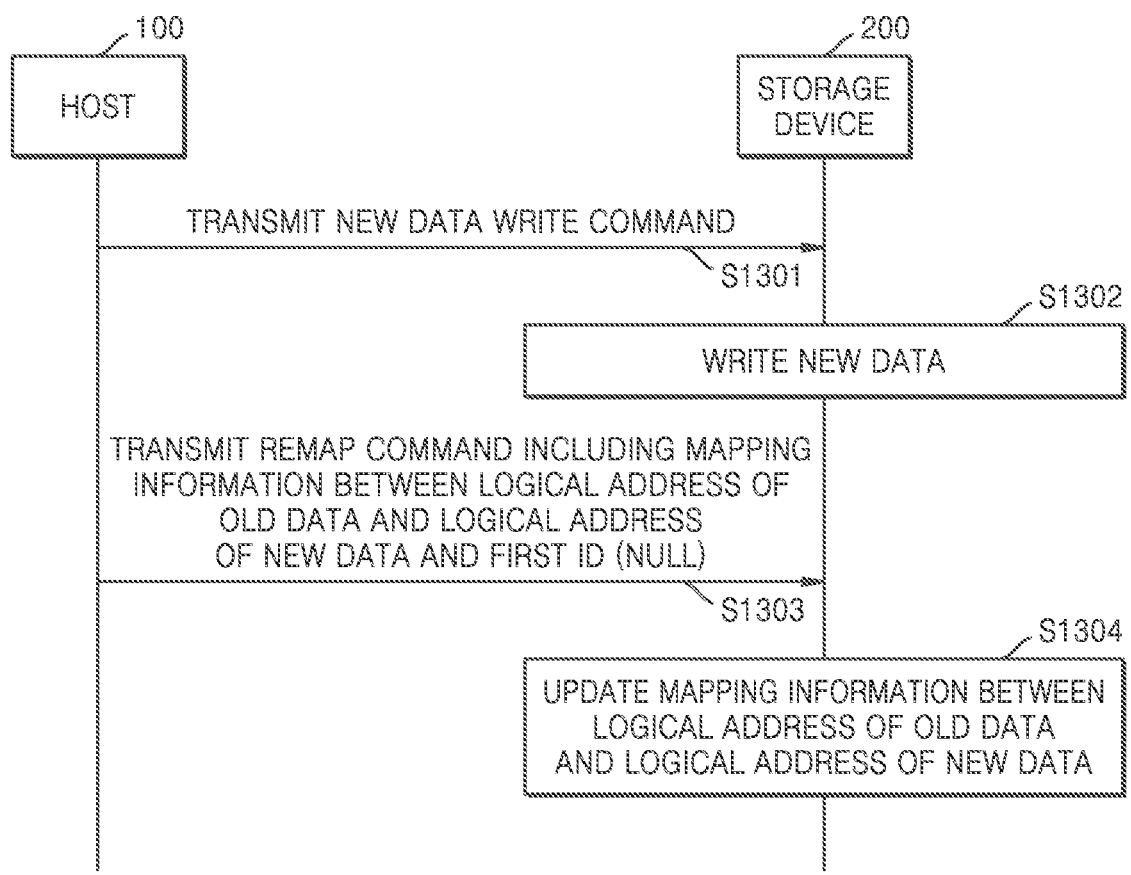

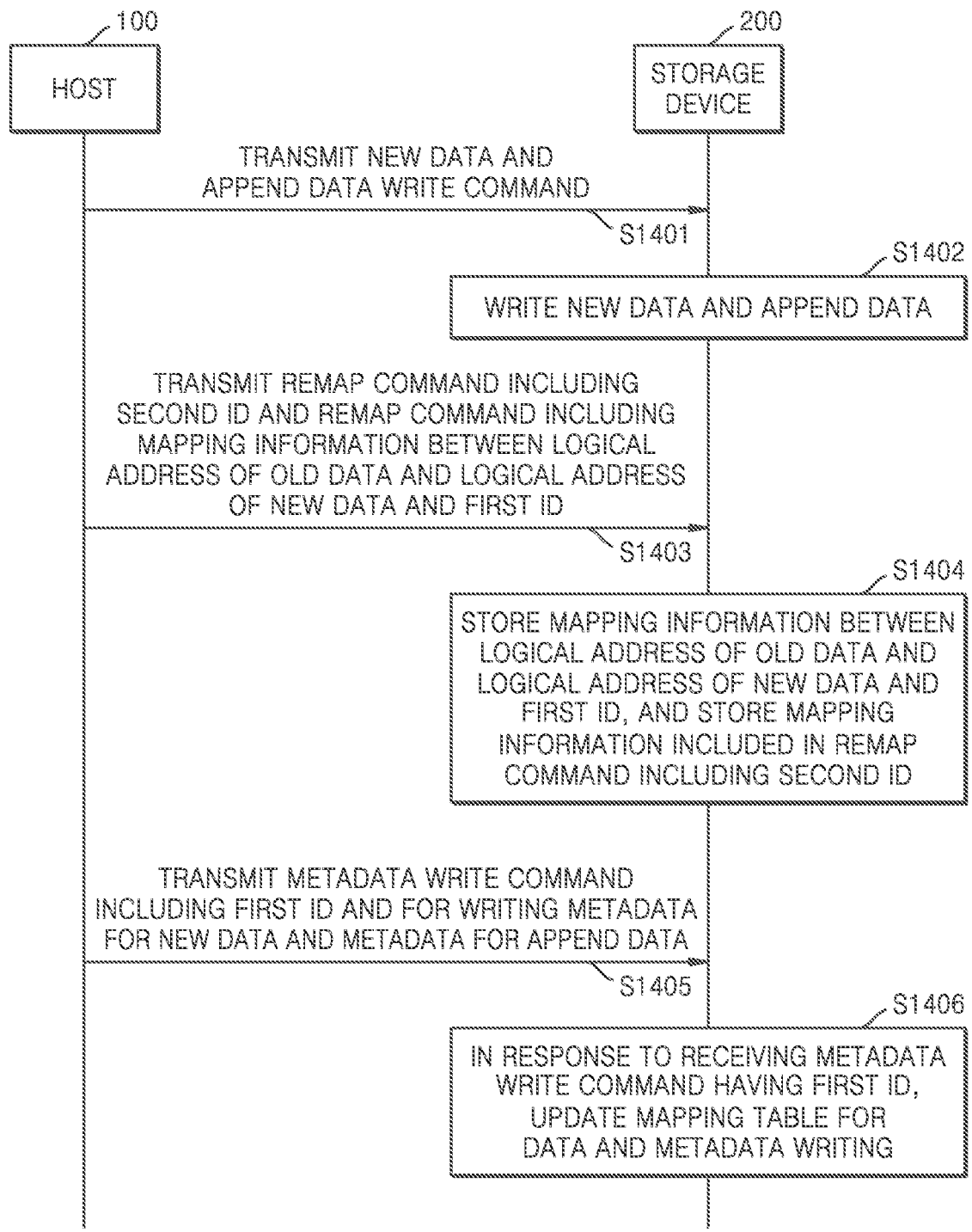

STORAGE DEVICE PERFORMING ATOMIC WRITE, HOST CONTROLLING STORAGE DEVICE, AND OPERATING METHOD OF STORAGE DEVICE

CROSS-REFERENCE TO RELATED APPLICATION

This application is based on and claims priority under 35 U.S.C. § 119 to Korean Patent Application No. 10-2022-0179739, filed on Dec. 20, 2022, in the Korean Intellectual Property Office, the disclosure of which is incorporated by reference herein in its entirety.

BACKGROUND

The present disclosure relates to a storage device, and more particularly, to a storage device performing an atomic write process, a host controlling the storage device, and an operating method of the storage device.

When updating data, a file system such as EXT4 and the like overwrites new data at the original position of the data. This is referred to as an in-place update method. In contrast, a log-structured file system (LFS) uses an out-of-place update method, in which past data is invalidated and new data is written to a different location. Accordingly, when old data is updated with new data in the LFS, a logical address of the old data may be different from a logical address of the new data.

An atomic write may refer to a write that satisfies all or nothing. For example, when power supply to a storage is blocked during writing of data in the storage and then the power supply to the storage resumes, the storage satisfies a state of storing all data or a state before writing data, which may be referred to as an atomic write. When data is updated in the LFS, an efficient atomic write method is required.

SUMMARY

Example embodiments provide a storage device performing an atomic write process, a host controlling the storage device, and an operating method of the storage device.

According to an aspect of an example embodiment, a storage device includes: a non-volatile memory: a volatile memory: and a storage controller configured to: receive a new data and append data write command from a host, write new data and append data to at least one of the non-volatile memory and the volatile memory, receive, from the host, a remap command including mapping information between old data and the new data and a first identification (ID), based on the remap command, store in the volatile memory the mapping information between the old data and the new data and the first ID, receive, from the host, a metadata write command requesting writing meta data for the append data and including the first ID, and based on the metadata write command, update the mapping information between the old data and the new data, and write metadata related to the append data to the non-volatile memory.

According to an aspect of an example embodiment, an operating method of a storage device communicating with a host and including a non-volatile memory and a volatile memory, includes: receiving a new data and append data write command from the host; writing the new data and the append data to at least one of the non-volatile memory and the volatile memory: receiving, from the host, a remap command including mapping information between old data and the new data and a first identification (ID); based on the remap command, storing, in the volatile memory, the mapping information between the old data and the new data and the first ID: receiving, from the host, a metadata write command requesting writing metadata, wherein the metadata is associated with the append data and the metadata write command includes the first ID: and in response to the metadata write command, updating the mapping information between the old data and the new data, and writing the metadata.

According to an aspect of an example embodiment, a storage device includes: a memory device: and a storage controller configured to: receive a new data and append data write command from a host, based on the write command, write the new data and the append data to the memory device, receive, from the host, a remap command including mapping information between old data and the new data and a first identification (ID), based on the remap command, store the mapping information between the old data and the new data and the first ID in a memory inside the storage controller, and receive, from the host, a metadata write command requesting writing metadata, wherein the metadata is associated with the append data and the metadata write command includes the first ID, and based on the metadata write command, update the mapping information between the old data and the new data, and write the metadata to the memory device.

BRIEF DESCRIPTION OF THE DRAWINGS

Example embodiments of the present disclosure will be more clearly understood from the following detailed description taken in conjunction with the accompanying drawings in which:

FIG. 5 is a flowchart of the operations of a host and a storage device, according to an embodiment:

FIG. 6B illustrates an example of writing, by a host, new data, append data, and metadata to a logical block address (LBA), according to an embodiment;

FIG. 12 is a flowchart of the operations of a host and a storage device, according to an embodiment;

FIGS. 13A and 13B are flowcharts of the operations of a host and a storage device, according to an embodiment;

FIG. 14 is a flowchart of the operations of a host and a storage device, according to an embodiment;

DETAILED DESCRIPTION

Hereinafter, an embodiment of the present inventive concept is described below in detail with reference to the drawings.

Figure 1:
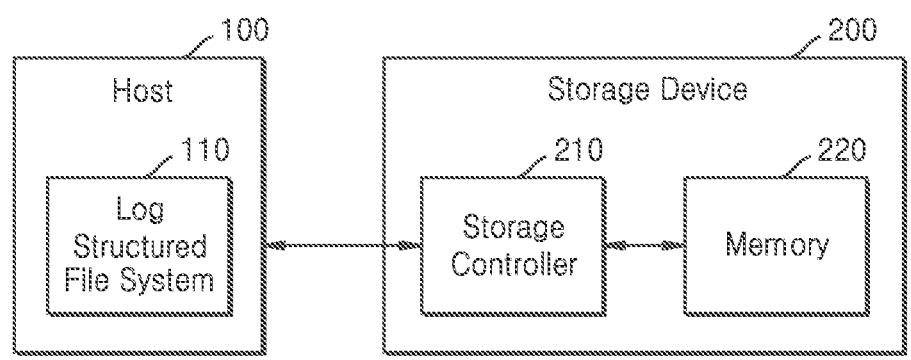
FIG. 1 is a block diagram of a host-storage system according to an embodiment.

FIG. 1 is a block diagram of a host-storage system 10 according to an embodiment. FIG. 1 may be described with reference to FIG. 4.

Referring to FIG. 1, the host-storage system 10 may include a host 100 and a storage device 200. Furthermore, the storage device 200 may include a storage controller 210 and a memory device 220. The host 100 may provide the storage device 200 with a request to write or read out data. Furthermore, in response to a data erasure request by the host 100, the storage device 200 may perform an erasure operation on data in an area indicated by the host 100.

The host 100 may include a file system. The file system processes input data to be stored at a specific logical or physical location in the storage device 200. In other words, when receiving data through a user application, the host 100 may process the input data through the file system and store the processed data in the storage device 200. The file system may be a log-structured file system (LFS) 110. For example, the file system may be a flash-friendly file system (F2FS) that is a file system of a Linux kernel designed according to the properties of flash memory, or a journaling flash file system (JFFS) that is a Linux log-structured file system used for a NOR flash memory device. When updating old data with new data, the F2FS does not overwrite new data to a logical block address (LBA) of the old data. The F2FS receives an assignment of a new LBA and writes new data to the assigned LBA. In other words, the F2FS performs out-of-place update, not in-place update.

The type of file system is not limited to the log-structured file system, and when a file is updated, the disclosure may be applied to any file system using a method of writing new data at an address different from a logical address at which old data is written.

The storage device 200 may include the storage controller 210 and the memory device 220. In the LFS, when old data is updated with new data, the logical address of the old data may be different from the logical address of the new data. The storage controller 210 may include a metadata manager 214 that manages mapping information of the logical address of old data and the logical address of new data. Metadata 218 (see FIG. 4) may include mapping information to convert a logical address to a physical address to access information stored in the memory device 220. For example, the mapping information between the old data and the new data may include first mapping information between a first logical address of the old data and a second logical address of the new data.

The storage device 200 may include storage media for storing data according to a request from the host 100. For example, the storage device 200 may include one or more solid state drives (SSDs). When the storage device 200 includes an SSD, the memory device 220 may include a plurality of flash memory chips (for example, NAND memory chips) for storing data in a non-volatile manner. Meanwhile, the memory device 220 may correspond to one flash memory device, or the memory device 220 may include a memory card including one or more flash memory chips. As a specific example, the storage device 200 may include one or more DRAM-less SSDs that do not include dynamic random access memory (DRAM).

When the storage device 200 includes a flash memory, the flash memory may include a 2D NAND memory array or a 3D (or vertical) NAND (VNAND) memory array. The 3D memory array, as arrays of memory cells having an active region disposed on a silicon substrate, or a circuit related to an operation of the memory cells, is formed monolithically on the substrate or at least one physical level of the circuit formed in the substrate. The term "monolithically" means that layers of respective levels constituting the array are stacked directly on layers of respective lower levels of the array.

In an embodiment according to the inventive concept, the 3D memory array may include vertical NAND strings arranged in a vertical direction such that at least one memory cell is located above another memory cell. The at least one memory cell may include an electric charge trap layer.

In an embodiment according to the inventive concept, the storage device 200 may include various other types of memories. For example, the storage device 200 may include a non-volatile memory, and the non-volatile memory may include various types of memories, such as magnetic random access memory (MRAM), spin-transfer torque MRAM, conductive bridging RAM (CBRAM), ferroelectric RAM (FeRAM), phase RAM (PRAM), resistive RAM (RRAM), nanotube RAM, polymer RAM (PoRAM), nano floating gate memory (NFGM), holographic memory, molecular electronics memory, insulator resistance change memory, and the like.

In an embodiment according to the inventive concept, the memory device 220 may be an embedded multi-media card (eMMC) or an embedded universal flash storage (UFS) memory device. In an example, the memory device 220 may be an external memory that is detachably attached to the storage device 200. In detail, the memory device 220 may be a UFS memory card, a compact flash (CF) card, a secure digital (SD) card, a micro secure digital (micro-SD) card, a mini secure digital (mini-SD) card, an extreme digital (xD) card, or a Memory Stick, but embodiments of the disclosure are not limited thereto.

The host 100 may communicate with the storage device 200 through various interfaces. In an example, the host 100 may communicate with the storage device 200 through various interfaces, such as a universal serial bus (USB) interface, a multimedia card (MMC) interface, a PCI express (PCI-e) interface, an AT attachment (ATA) interface, a serial AT attachment (SATA) interface, a parallel AT attachment (PATA) interface, a small computer system interface (SCSI), a serial attached SCSI (SAS) interface, an enhanced small disk interface (ESDI), an integrated drive electronics (IDE) interface, a non-volatile memory express (NVMe) interface, and the like.

When updating old data of a certain file with new data, the host 100 according to an embodiment may transmit a new data write request (or a new data write command) to the storage device 200. Furthermore, the host 100 may transmit an append data write command to the storage device 200. Append data write may refer to additionally writing new data, not updating old data with new data. The host 100 may transmit, to the storage device 200, a remap command including mapping information between the logical address of the old data and the logical address of the new data and a first identification (ID). The host 100 may transmit, to the storage device 200, a metadata write command for writing metadata of append data and including the first ID. For clarity, a metadata write command may also be referred to as a metadata write command.

The host 100 according to an embodiment may guarantee an atomic write of new data and append data by transmitting, to the storage device 200, a metadata write command having the same ID as that of the remap command.

The storage device 200 according to an embodiment may receive a new data and append data write command from the host 100, and write new data and append data. The storage device 200 may receive, from the host 100, the remap command including mapping information between the old data and the new data and the first ID, and store the mapping information between the logical address of the old data and the logical address of the new data and the first ID. The storage device 200 may receive, from the host 100, the metadata write command for writing metadata of append data and including the first ID, and in response to the receiving of the metadata write command having the same ID as that of the remap command, update the mapping information between old data and new data and write metadata for the append data.

When the storage device 200 according to an embodiment is an NVMe SSD following NVMe specifications, the first ID may be included in a reserved field in an NVMe command.

When the storage device 200 according to an embodiment is a SATA SSD or UFS following SATA specifications, the first ID may be included in a reserved field in a command descriptor block (CDM) of a write command.

When receiving the metadata write command having the same ID as that of the remap command, the storage device 200 according to an embodiment may perform atomic write on the new data and the append data by simultaneously performing mapping information update between old data and new data and metadata update of append data.

The host 100 and the storage device 200 according to an embodiment does not write a log in relation with a new data write operation, so that the amount of write may decrease.

The host 100 and the storage device 200 according to an embodiment may not perform metadata write on new data in relation with the new data write operation, so that the amount of metadata write may decrease.

Meanwhile, the host 100 may transmit, to the storage device 200, a command CMD, data, and pieces of other information about the data. For example, for a write command, the host 100 may transmit data to write and information about the data, with a write command, to the storage device 200. The information about data may be information, such as a logical address, a size, the attributes, and the like of data, used to store and manage data.

The command generated by the host 100 may be generated on a submission queue of a certain memory in the host 100. The submission queue may be a circular buffer in which the command generated in the host 100 is stored after generation before execution. After the execution of a command is complete, the storage device 200 may transmit, to the host 100, information (completion) notifying that the execution of a command is completed.

Figure 2:
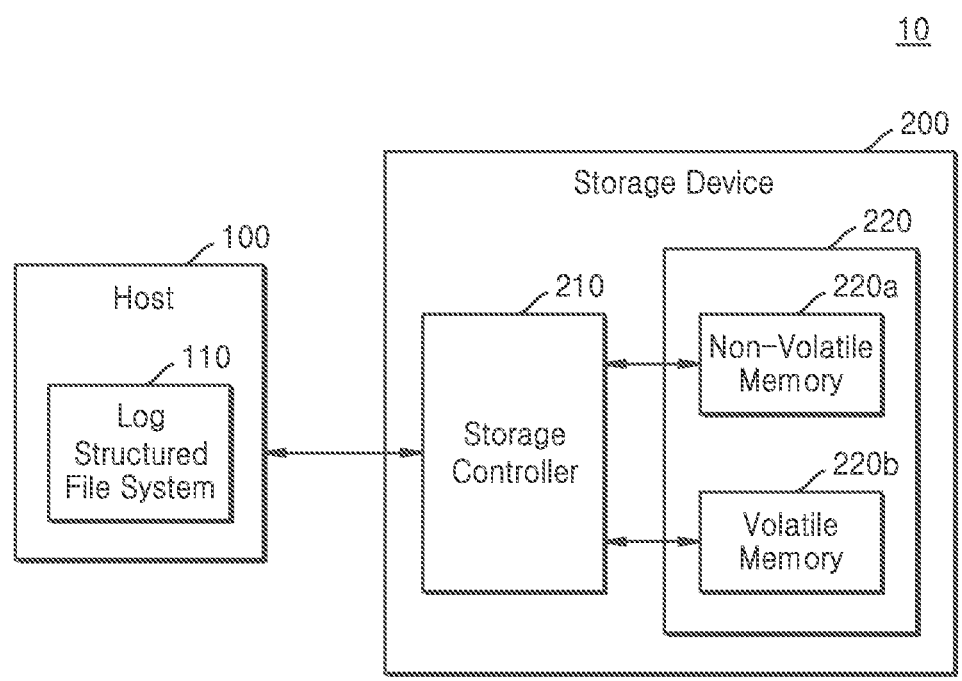
FIG. 2 is a block diagram of a host-storage system according to an embodiment.

FIG. 2 is a block diagram of a host-storage system according to an embodiment. FIG. 2 may be described with reference to FIGS. 1 and 4, and a redundant description thereof may be omitted.

Referring to FIG. 2, the host-storage system 10 may include the host 100 and the storage device 200. The storage device 200 may include the storage controller 210 and the memory device 220. The memory device 220 may include a non-volatile memory (NVM) 220a and a volatile memory 220b. The volatile memory 220b may include at least one of static random access memory (SRAM) and DRAM. As an example, the storage device 200 may be an SSD including DRAM.

When updating old data of a certain file with new data, the host 100 according to an embodiment may transmit a new data write request (or a new data write command) to the storage device 200. Furthermore, the host 100 may transmit an append data write command to the storage device 200. The host 100 may transmit, transmit, to the storage device 200, a flush command to write data stored in the volatile memory 220b to the NVM 220a. The host 100 may transmit, to the storage device 200, a remap command including mapping information between the logical address of the old data and the logical address of the new data and the first ID. The host 100 may transmit, to the storage device 200, a metadata write command for writing metadata of append data and including the first ID.

The storage device 200 according to an embodiment may receive, from the host 100, a new data and append data write command, and write new data and append data. The storage device 200 may write the new data and the append data to at least one of the NVM 220a and the volatile memory 220b. The NVM 220a and the volatile memory 220b may be located outside the storage controller 210. The storage device 200 may receive, from the host 100, a flush command to write the data stored in the volatile memory 220b to the NVM 220a. The storage device 200 may write, in response to the flush command, the data stored in the volatile memory 220b to the NVM 220a. The storage device 200 may receive, from the host 100, the remap command including the mapping information between the logical address of the old data and the logical address of the new data and the first ID, and store the mapping information between the logical address of the old data and the logical address of the new data and the first ID. The storage device 200 may receive, from the host 100, a metadata write command for writing metadata of append data and including the first ID, and in response to the receiving of the metadata write command having the same ID as that of the remap command, and update the mapping information between old data and new data and write metadata for the append data.

The storage device 200 according to an embodiment may store the mapping information between the old data and the new data and the first ID included in the remap command in the memory in the storage controller 210. For example, the storage device 200 may store the mapping information between the old data and the new data and the first ID included in the remap command in at least one of RAM 212, read only memory (ROM) 215, and a buffer memory 217. As a specific example, the RAM 212 may be any one of SRAM and DRAM.

The storage device 200 according to an embodiment may store, in the volatile memory 220b, the mapping information between the old data and the new data and the first ID included in the remap command. For example, the storage device 200 may store the mapping information between the old data and the new data and the first ID included in the remap command in DRAM located outside the storage controller 210.

The host 100 according to an embodiment may transmit, transmit, to the storage device 200, a flush command for writing the data stored in the volatile memory 220b to the NVM 220a and including the first ID. The host 100 may transmit, to the storage device 200, the remap command including the mapping information between the logical address of the old data and the logical address of the new data and the first ID. The host 100 may transmit, to the storage device 200, a metadata write command for writing metadata of the new data and metadata of the append data and including the first ID. The storage device 200 may write, in response to the metadata write command having the first ID received from the host 100, the data stored in the volatile memory 220b to the NVM 220a, and update the mapping information between the old data and the new data and write metadata for the append data.

Figure 3:
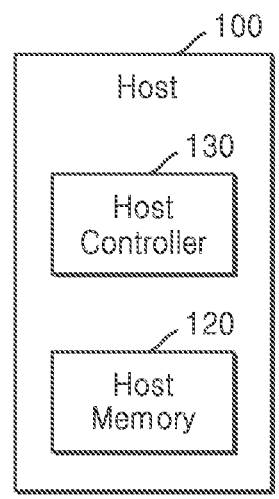
FIG. 3 is a block diagram of a host device according to an embodiment.

FIG. 3 is a block diagram of a host device according to an embodiment. FIG. 3 may be described with reference to FIGS. 1 and 2, and a redundant description thereof may be omitted.

Referring to FIG. 3, the host 100 may include a host controller 110 and a host memory 120. The host memory 120 may function as a buffer memory to temporarily store data to be transmitted to the storage device 200, or data transmitted from the storage device 200.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules provided in an application processor, and the application processor may be implemented as a system-on-chip (SoC). Furthermore, the host memory 120 may be an embedded memory included in the application processor, or a non-volatile memory or memory module arranged outside the application processor.

The host controller 110 may manage an operation of storing data, for example, write data, of a buffer area in the NVM 220a, or storing data, for example, read-out data, of the NVM 220a in the buffer area.

Figure 4:
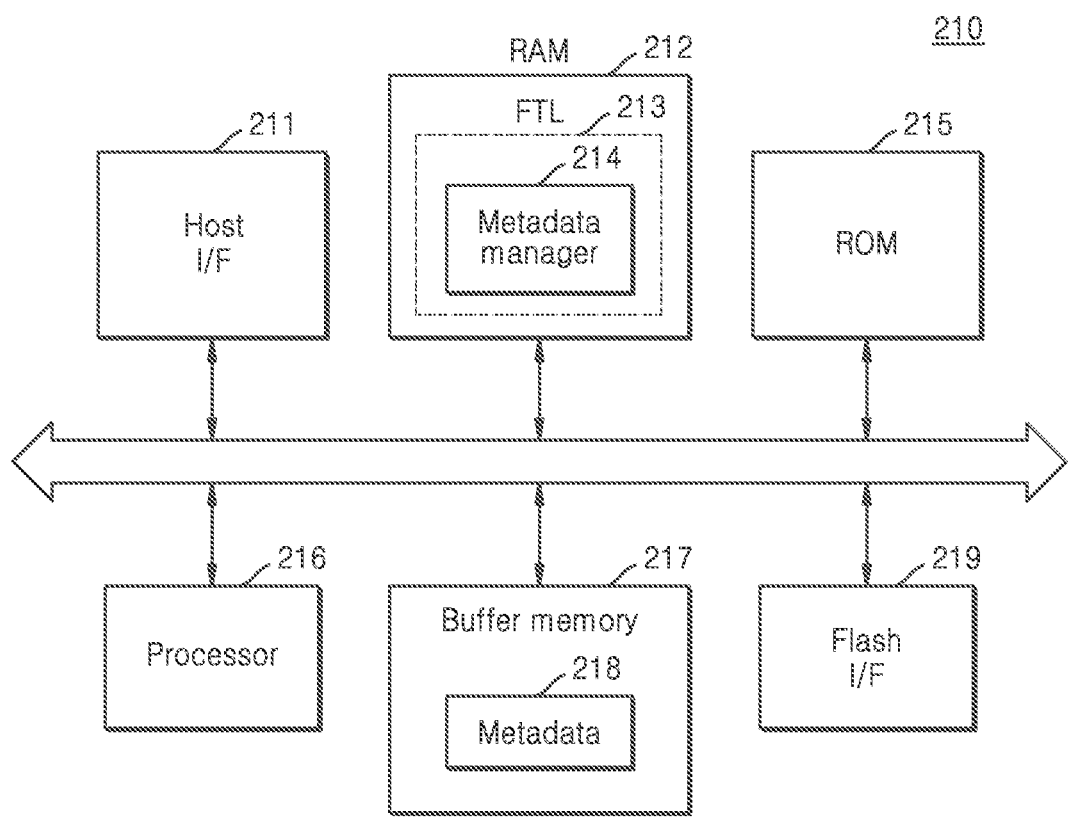
FIG. 4 is a block diagram of a storage controller according to an embodiment.

FIG. 4 is a block diagram of a storage controller according to an embodiment. FIG. 4 may be described with reference to FIGS. 1 and 2, and a redundant description thereof may be omitted.

Referring to FIG. 4, the storage controller 210 may include a host interface (Host I/F) 211, RAM 212, ROM 215, a processor 216, the buffer memory 217, a flash interface (flash I/F) 219.

The host interface 211 according to embodiments may receive various requests by communicating with the host 100 and transmit various pieces of information. For example, the host interface 211 may receive, from the host 100, new data information with a write command.

Through an initial connection process of the host 100 and the storage device 200, each field included in the write command may be stored in the RAM 212 or the ROM 215 in the storage controller 210.

The host interface 211 may perform communication with the host 100 according to a certain interface, for example, various types of interfaces, such as NVMe, a UFS interface, and the like.

The RAM 212 may include a flash translation layer (FTL) 213. The flash translation layer 213 may mean middleware for mapping the logical address of a file system and the physical address of the memory device 220 between the file system of the host 100 and the memory device 220. The logical address may include an LBA, and the physical address may include a physical block address (PBA) and a physical page number (PPN).

The flash translation layer 213 may perform a wear-leveling operation for managing a wear-level of the memory device 220, in addition to the address mapping, and also perform a garbage collection operation for generating pre-blocks. Furthermore, the flash translation layer 213 may include the metadata manager 214.

The metadata manager 214 according to an embodiment may store the mapping information between the logical address of the old data and the logical address of the new data and the first ID included in the remap command in at least one of the RAM 212, the ROM 215, the buffer memory 217, the NVM 220a, and the volatile memory 220b. Furthermore, the metadata manager 214 may update, in response to the metadata write command having the same ID as that of the remap command, the mapping information between old data and new data and write metadata for the append data.

The ROM 215 may be ROM for storing a program executed by the processor 216. The ROM 215 may store a program implementing an operation of the storage controller 210 or firmware in which the program is recorded.

The processor 216 may control, by executing various programs stored in the ROM 215, the overall operation of the storage device 200. The processor 216 may execute a program constituting the metadata manager 214.

The buffer memory 217 may temporarily store the data received from the host 100 through the host interface 211 or the data received from the memory device 220, and store the metadata 218.

The metadata 218 means various pieces of information needed for the storage device 200 to manage or store data. For example, the metadata 218 may include mapping information between a logical address and a physical address used for writing or reading out data, information indicating whether data is valid, or the like.

The meta area is where the metadata 218 is stored, and may be included in the buffer memory 217. The area where the metadata 218 is stored is not limited thereto, and the metadata 218 may be stored in a storage circuit of an internal cache of the storage controller 210, or in the memory device 220 in a non-volatile manner.

The buffer memory 217 may be implemented as volatile memories, such as DRAM, SDRAM, DDR SDRAM, LPDDR SDRAM, GRAM, and the like, or non-volatile memories, such as FRAM, ReRAM, STT-MRAM, PRAM, and the like. The flash interface 219 may control signals for driving the memory device 220, and may be configured to access the memory device 220 under the control of the processor 216. The flash interface 219 may be configured such that software and hardware interleave operations are selectively performed through at least one channel.

Furthermore, the flash interface 219 may provide an interface with a plurality of storage media included in the storage device 200. For example, the flash interface 219 may perform independent communications with the storage media through a plurality of channels Although FIG. 4 illustrates an example in which the write operation according to an embodiment is performed by a software method, the embodiments of the present disclosure are not limited thereto. In the embodiment illustrated in FIG. 4 As an example, at least a part of the operations performed by executing software loaded in the RAM 212 and the ROM 215 may be performed through a circuit implemented in hardware.

The flash translation layer 213 may obtain a physical address corresponding to the logical address of the new data, based on the mapping information included in the metadata 218. The processor 216 may write new data at the physical address in the memory device 220 through the flash interface 219.

FIG. 5 is a flowchart of the operations of the host 100 and the storage device 200, according to an embodiment. FIG. 5 may be described with reference to FIGS. 1 and 2.

Referring to FIG. 5, in operation S501, the host 100 may transmit a new data and append data write command to the storage device 200.

In operation S502, the storage device 200 may write new data and append data.

In operation S503, the host 100 may transmit, to the storage device 200, a remap command including mapping information between the old data and the new data and a first ID. The mapping information between the old data and the new data may include mapping information between the logical address of the old data and the logical address of the new data.

In operation S504, the storage device 200 may store the mapping information between the logical address of the old data and the logical address of the new data and the first ID. Operations S503 and S504 are described below in detail with reference to FIG. 7.

In operation S505, the host 100 may transmit, to the storage device 200, a metadata write command for writing metadata of append data and including the first ID. In operation S506, the storage device 200 may update, in response to the receiving the metadata write command having the same ID as that of the remap command, mapping information between the old data and the new data and write metadata for the append data. For example, the storage device may receive, from the host, a metadata write command requesting writing metadata, for which the metadata is associated with the append data and the metadata write command includes the first ID. Operations S505 and S506 are described below in detail with reference to FIG. 8.

Figure 6A:
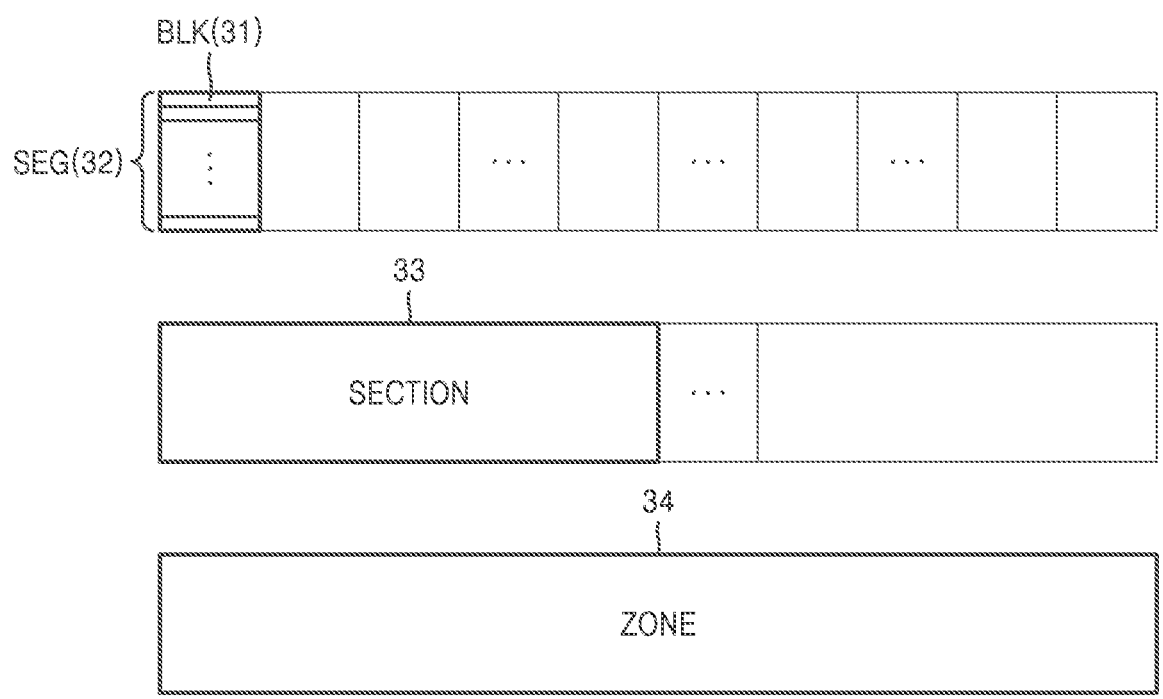
FIG. 6A illustrates a configuration unit of data stored in a host and a storage device, according to an embodiment.

FIG. 6A illustrates a configuration unit of data stored in the host 100 and the storage device 200, according to an embodiment. FIG. 6A may be described with reference to FIGS. 1 and 2.

Referring to FIG. 6A, a segment (SEG) 32 may include a plurality of blocks (BLK) 31, a section or sector 33 may include a plurality of segments 32, and a zone 34 may include a plurality of sections 33. For example, the block 31 may be 4 Kbyte, and the segment 32 may be 2M byte by including 512 blocks 31. Such a configuration may be determined at the time of formatting the storage device 200, but embodiments of the disclosure is not limited thereto. The sizes of the section 33 and the zone 34 may be corrected at the time of format. An F2FS file system may read/write all data in page units of 4 Kbyte. In other words, one page may be stored in the block 31, and a plurality of pages may be stored in the segment 32.

FIG. 6B illustrates an example of writing, by the host 100, new data, append data, and metadata to an LBA, according to an embodiment. FIG. 6B may be described with reference to FIGS. 1 and 2.

Referring to FIG. 6B, pieces of data D0, D1, D2, and D3 are written in an old data segment 40. The pieces of data D0, D1, D2, and D3 are written in a block #12, a block #13, a block #14, and a block #15, respectively. The number of a block is assigned, for convenience, to explain the respective blocks, not to limit the order or position of a block. The host 100 may update some of pieces of data that are written. For example, the host 100 may update the pieces of data D1 and D3. The pieces of data D1 and D3 that are old may be updated to new pieces of data D1' and D3', respectively. The host 100 may write the new pieces of data D1' and D3' to a new data segment 41. The host 100 may write new data to a block that is different from a block in which old data is written. For example, the host 100 may perform a sequential write on the new pieces of data D1' and D3' to block #80 and block #81. The host 100 may additionally write new data as well as the new pieces of data D1' and D3'. For example, the host 100 may write append data D4 to a block #100 of an append data segment.

"N0" denotes metadata of the old data (D0, D1, D2, and D3). "N0" is written to a block #150 of a metadata segment 43. According to an embodiment, the host 100 transmits mapping information between LBAs (#13 and #15) of the old data (D1 and D3) and LBAs (#80 and #81) of new data, to the storage device 200, and when the storage device 200 writes new data based on the mapping information, metadata update may be unnecessary. In other words, when the host 100 writes only new data without writing the append data D4, the metadata update may be unnecessary. However, when the host 100 writes not only the new pieces of data D1' and D3', but also the append data D4, the metadata update may be necessary for the append data D4. Accordingly, the host 100 may write "N0'" including information of the append data D4 to a block #151 of the metadata segment 43.

Figure 7:
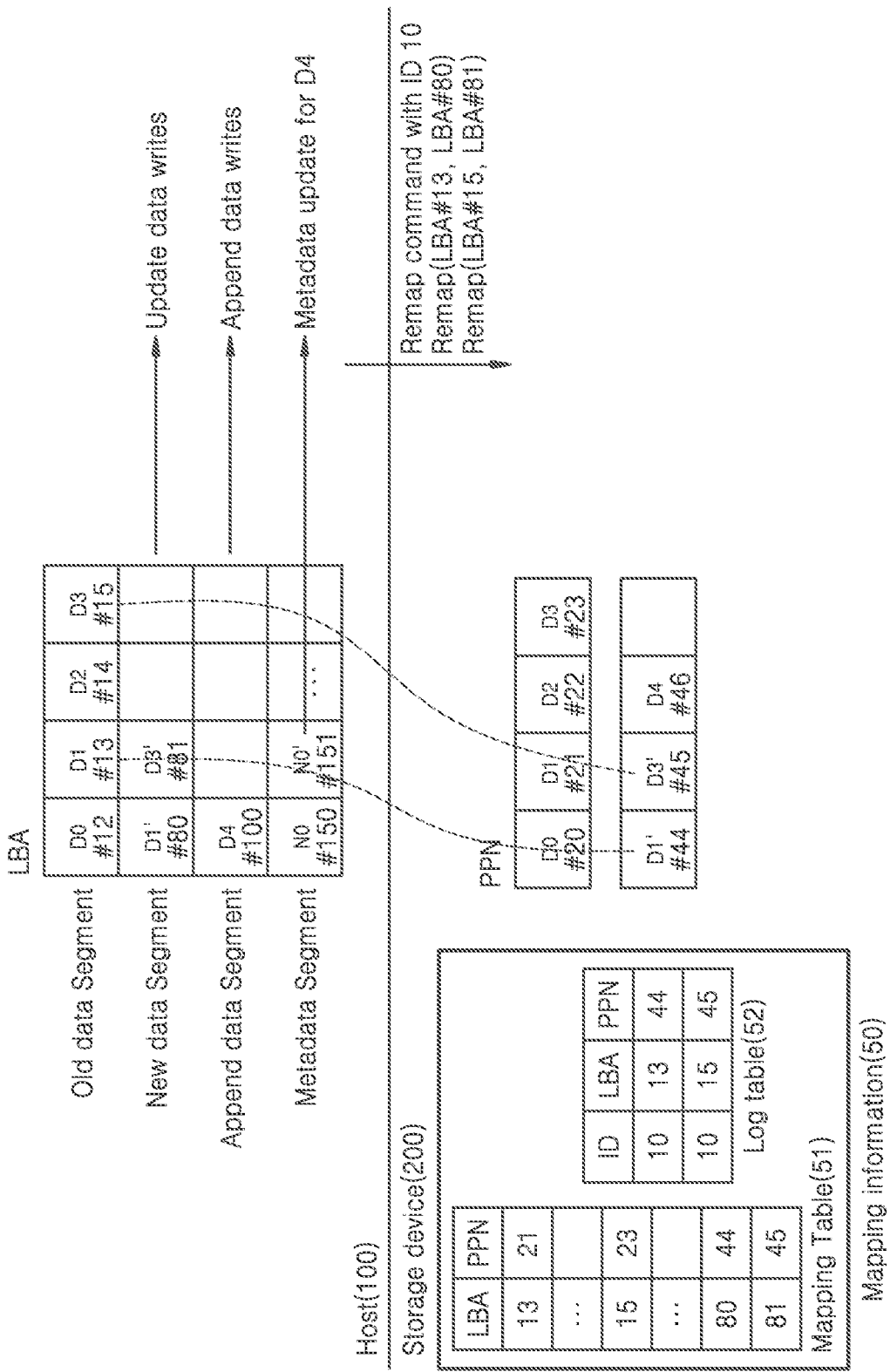
FIG. 7 illustrates operations of a host and a storage device, according to an embodiment.

FIG. 7 illustrates operations of the host 100 and the storage device 200, according to an embodiment. FIG. 7 may be described with reference to FIGS. 1, 2, and 6B.

FIG. 7 illustrates operations S503 and S504 of FIG. 5 in detail with an example. For convenience of explanation, FIG. 7 is described based on the old data, new data, and append data of FIG. 6B. A redundant description thereof may be omitted.

Referring to FIG. 7, the host 100 may transmit a remap command including identification (ID)=10 to the storage device 200. The remap command may include mapping information between an LBA of old data and an LBA of new data. For example, a remap command may include information that the block #13 that is an LBA of the old data D1 corresponds to the block #80 that is an LBA of the new data D1', and the block #15 that is an LBA of the old data D3 corresponds to the block #81 that is an LBA of the new data D3'. In other words, the remap command may include an ID and mapping information between the logical address of the old data and the logical address of the new data. The ID of the remap command may be an ID for matching an update time of metadata for the append data D4 and an update time of a mapping table between old data and new data. For example, the mapping table may include first logical address of the old data and a first physical address of the old data and a second logical address of the new data and a second physical address of the new data.

The storage device 200 may receive a write command for the new pieces of data D1' and D3' and the append data D4, before receiving the remap command. A new data write command and an append data write command may be transmitted to the storage device 200, as one write command or separated write commands. The storage device 200 may write, in response to the write command, the new data D1' to a PPN block #44. The storage device 200 may write, in response to the write command, the new data D3' to a PPN block #45.

The storage device 200 may store a mapping table 51 including information about an LBA of old data, a PPN of the old data, an LBA of new data, and a PPN of the new data. Referring to FIG. 7, the storage device 200 may store the mapping table 51 including the LBA #13 of the old data D1, the PPN #21 of the old data D1, the LBA #80 of the new data D1', the PPN #44 of the new data D1', the LBA #15 of the old data D3, and the PPN #45 of the new data D3'.

The storage device 200 may receive a remap command including mapping information between the LBA of the old data and the LBA of the new data. The storage device 200 may check, in response to the remap command, the PPN of the old data and the PPN of the new data. The storage device 200 may generate and store a log table 52 based on the mapping information between the LBA of the old data and the LBA of the new data, the ID of the remap command, and the PPN information. As an example, the storage device 200 may store the log table 52 that corresponds the LBA of the old data to the PPN of the new data.

The storage device 200 may adjust a mapping update time between the old data and the new data by storing the log table 52. For example, the log table may include a first ID and a first logical address of the old data and a second physical address of the new data. The mapping update between the old data and the new data may include an update of matching the LBA of the old data and the PPN of the new data. For example, the storage device 200 may update, by storing the log table 52, mapping between the old data and the new data, not at a time when receiving the remap command, but at a time when writing metadata including the attributes of the append data D4.

The storage device 200 according to an embodiment may store the mapping information 50 including the mapping table 51 and the log table 52 in the volatile memory 220*b*. For example, the storage device 200 may store the mapping information 50 in at least one of SRAM and DRAM.

The storage device 200 according to an embodiment may store the mapping information 50 including the mapping table 51 and the log table 52 in the storage controller 210. As a specific example, the storage device 200 may store the mapping information 50 in the buffer memory 217.

Figure 8:
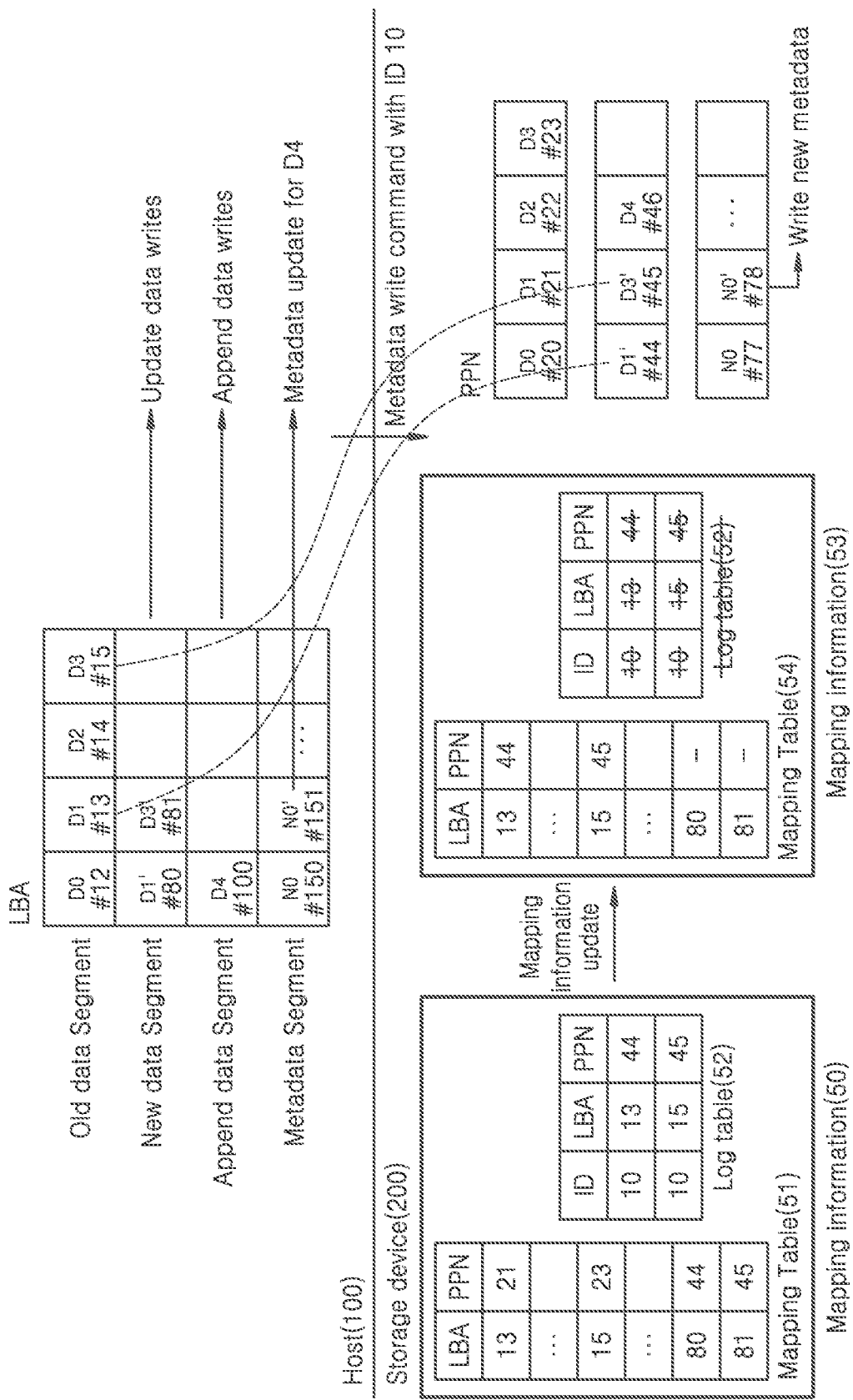
FIG. 8 illustrates operations of a host and a storage device, according to an embodiment.

FIG. 8 illustrates operations of the host 100 and the storage device 200, according to an embodiment. FIG. 8 may be described with reference to FIGS. 1, 2, and 6B.

FIG. 8 illustrates operations S505 and S506 of FIG. 5 in detail with an example. For convenience of explanation, operations S505 and S506 are described based on the old data, new data, and append data of FIG. 6B. A redundant description thereof may be omitted.

Referring to FIG. 8, a metadata block N0 #150 may include metadata for D0, D1, D2, and D3. A metadata block N0' #151 may include metadata for D0, D1', D2, D3', and D4.

The host 100 may transmit, to the storage device 200, a metadata write command including that ID=10. The metadata write command may be a command to write metadata for the append data D4. The metadata write command may be a command to write the metadata block N0'.

When receiving a metadata write command having the same ID as that of the remap command, the storage device 200 may not only write metadata, but also update mapping information between old data and new data. For example, when receiving a metadata write command having the same ID as that of the remap command, the storage device 200 may match the LBA of old data with the PPN of new data.

As a specific example, the storage device 200 may apply the log table 52 to the mapping table 51 in response to the metadata write command including that ID=0, the log table 52 being generated in response to the remap command including that ID=0. In other words, the storage device 200 may update the mapping table 51 in response to the metadata write command. In other words, the storage device 200 may generate a mapping table 54 reflecting the mapping information between old data and new data based on the log table 52. Referring to FIG. 8, the storage device 200 may match the LBA of old data #13 to the PPN of new data #44, and the LBA of old data #15 to the PPN of new data #45, by applying the log table 52 to the mapping table 51.

In other words, the storage device 200 may change PPN #21 of the old data D1 to PPN #44 of the new data D1', and PPN #23 of the old data D3 to PPN #45 of the new data D3'. Furthermore, the storage device 200 may delete PPNs corresponding to the PPN #80 of the new data D1' and the PPN #81 of the new data D3'. After the mapping table 51 is updated to the mapping table 54, the log table 52 may be deleted.

The storage device 200 may update the mapping table 51 and simultaneously write new metadata N0', in response to the metadata write command. The new metadata may include an indication of being metadata serving as a reference in a recovery operation. The recovery operation may refer to a case in which the storage device 200 is shocked or the supply of current is instantly cut off, and then resumes an operation.

As described above, the metadata block N0 #150 may include metadata for D0, D1, D2, and D3. The metadata block N0' #151 may include metadata for D0, D1', D2, D3', and D4. However, according to an embodiment, as the storage device 200 updates the mapping information between old data and new data, the logical address of the new data D1' may be the same as that of the old data D1, and the logical address of the new data D3' may be the same as the logical address of the old data D3. Accordingly, even when updating the old pieces of data D1 and D3 to the new pieces of data D1' and D3', respectively, the storage device 200 may not need write metadata for new data. Accordingly, there is an effect that overhead on the metadata write is reduced in the storage device 200.

The metadata block N0' may include metadata for the append data D4. The storage device 200 may guarantee atomic write for the new pieces of data D1' and D3' and the append data D4, by simultaneously write metadata for append data and update the mapping information 50. When transmitting a metadata write command for the metadata block N0', the host 100 may also transmit a marking that guarantees atomic write based on the metadata block N0'. The storage device 200 having received the metadata write command including the marking that guarantees atomic write based on the metadata block N0' may guarantee atomic write for D1', D3' and D4.

Figure 9:
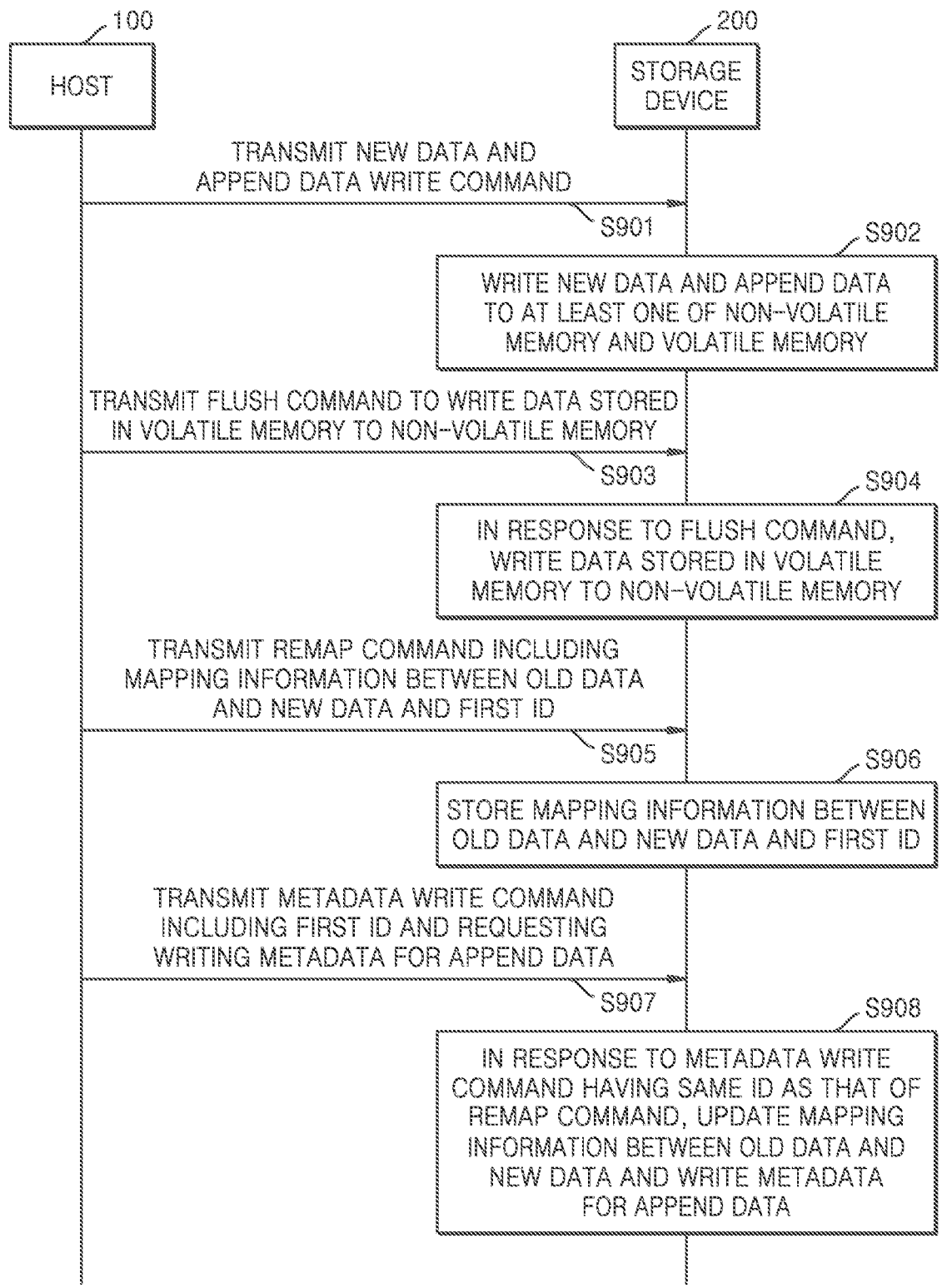
FIG. 9 is a flowchart of the operations of a host and a storage device, according to an embodiment.

FIG. 9 is a flowchart of the operations of the host 100 and the storage device 200, according to an embodiment. FIG. 9 may be described with reference to FIGS. 1, 2, and 6.

Referring to FIG. 9, in operation S901, the host 100 may transmit a new data and append data write command to the storage device 200.

In operation S902, the storage device 200 may write, in response to the write command, new data and append data to at least one of the NVM 220*a* and the volatile memory 220*b*. For example, the storage device 200 may write part of new data and part of append data to the NVM 220*a*, and the other part of the new data and the other part of the append data to the volatile memory 220*b*. As another example, the storage device 200 may write new data and append data only to the volatile memory 220*b* or only to the NVM 220*a*.

In operation S903, the host 100 may transmit, transmit, to the storage device 200, a flush command to write the data stored in the volatile memory 220*b* to the NVM 220*a*. As an example, the host 100 may transmit, to the storage device 200, a flush command to selectively write only the LBA of new data to the NVM 220*a*, not a flush command to write all blocks in a write cache of the storage device 200 to the NVM 220*a*.

In operation S904, the storage device 200 may write, in response to the flush command, when there are new data and/or append data written to the volatile memory 220*b*, the new data and/or append data written to the volatile memory 220*b*, to the NVM 220*a*.

In operation S905, the host 100 may transmit a remap command including mapping information between old data and new data and a first ID to the storage device 200. The mapping information between old data and new data may include mapping information between the logical address of the old data and the logical address of the new data.

In operation S906, the storage device 200 may store, in response to the remap command, the mapping information between old data and new data and the first ID.

In operation S907, the host 100 may transmit, to the storage device 200, a metadata write command including the first ID and requesting writing metadata for append data.

In operation S908, the storage device 200 may update, in response to the metadata write command having the same ID as that of the remap command, the mapping information between the old data and the new data and write metadata for the append data.

Figure 10:
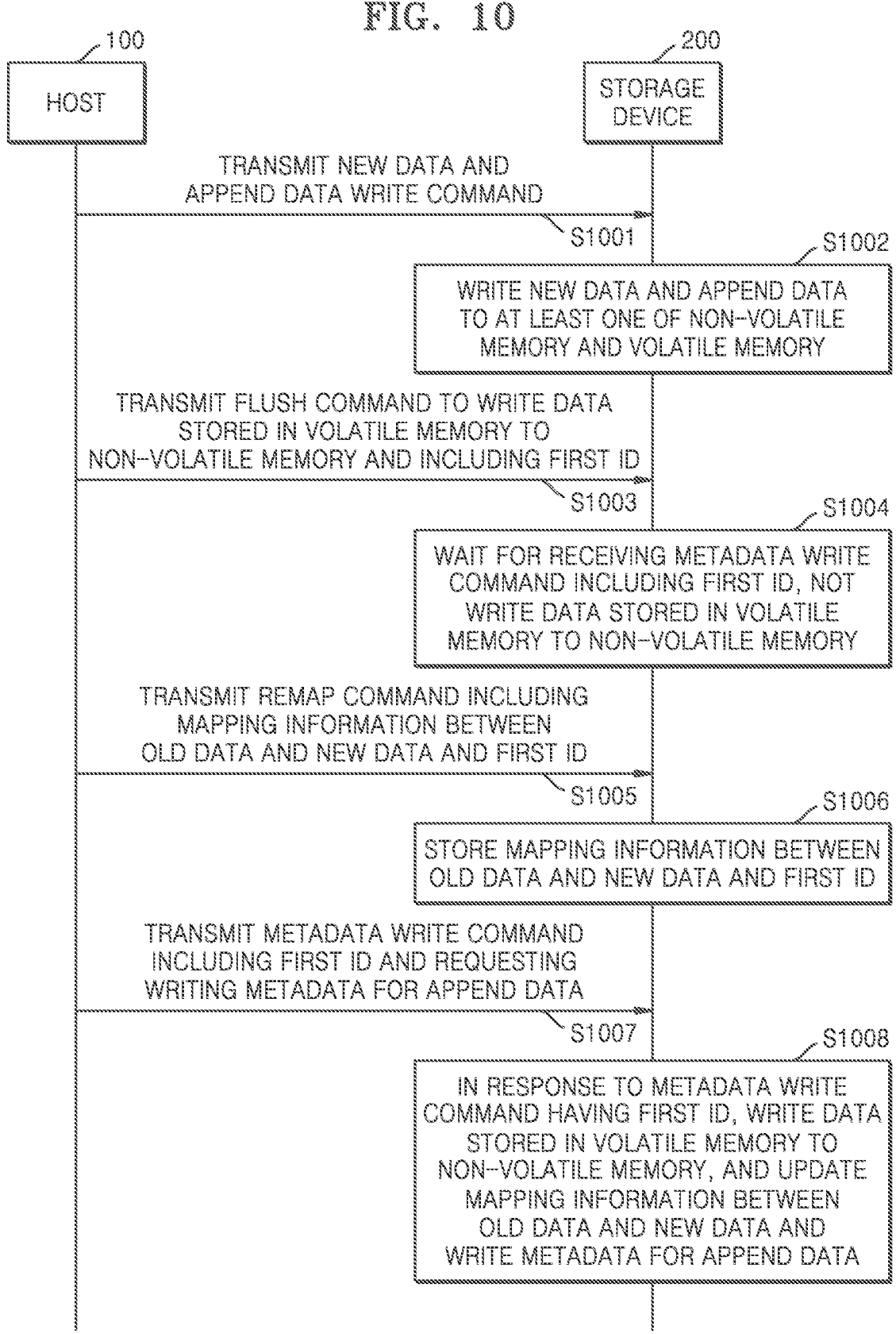
FIG. 10 is a flowchart of the operations of a host and a storage device, according to an embodiment.

FIG. 10 is a flowchart of the operations of the host 100 and the storage device 200, according to an embodiment. FIG. 10 may be described with reference to FIGS. 1, 2, and 9. A redundant description is omitted.

Referring to FIG. 10, in operation S1001, the host 100 may transmit, to the storage device 200, a new data and append data write command.

In operation S1002, the storage device 200 may write, in response to the write command, new data and append data to at least one of the NVM 220*a* and the volatile memory 220*b*.

In operation S1003, the host 100 may transmit, to the storage device 200, a flush command to write data stored in the volatile memory 220*b* to the NVM 220*a*. The flush command may include the first ID.

In operation S1004, the storage device 200 may wait for, in response to the flush command including the first ID, receiving a metadata write command including the first ID. In other words, even when receiving a flush command including the first ID, if not receiving a metadata write command including the first ID, the storage device 200 may not write the new data and/or append data written to the volatile memory 220*b* to the NVM 220*a*.

In operation S1005, the host 100 may transmit, to the storage device 200, a remap command including the mapping information between old data and new data and the first ID. The mapping information between old data and new data may include the mapping information between the logical address of the old data and the logical address of the new data.

In operation S1006, the storage device 200 may store, in response to the remap command, the mapping information between the logical address of the old data and the logical address of the new data and the first ID.

In operation S1007, the host 100 may transmit to the storage device 200 a metadata write command including the first ID and requesting writing metadata for append data.

In operation S1008, the storage device 200 may write, in response to the metadata write command having the same first ID as that of the remap command, the data stored in the volatile memory 220*b* to the NVM 220*a*, and update the mapping information between the old data and the new data and write metadata for the append data.

In detail, when part or all of the new data and/or append data is written to the volatile memory 220*b*, the storage device 200 may write, to the NVM 220*a*, the part or all of the new data and/or append data written to the volatile memory 220*b*. Furthermore, the storage device 200 may update the mapping information between the old data and the new data and simultaneously write metadata for the append data, in response to the metadata write command having the same first ID as that of the remap command.

Figure 11:
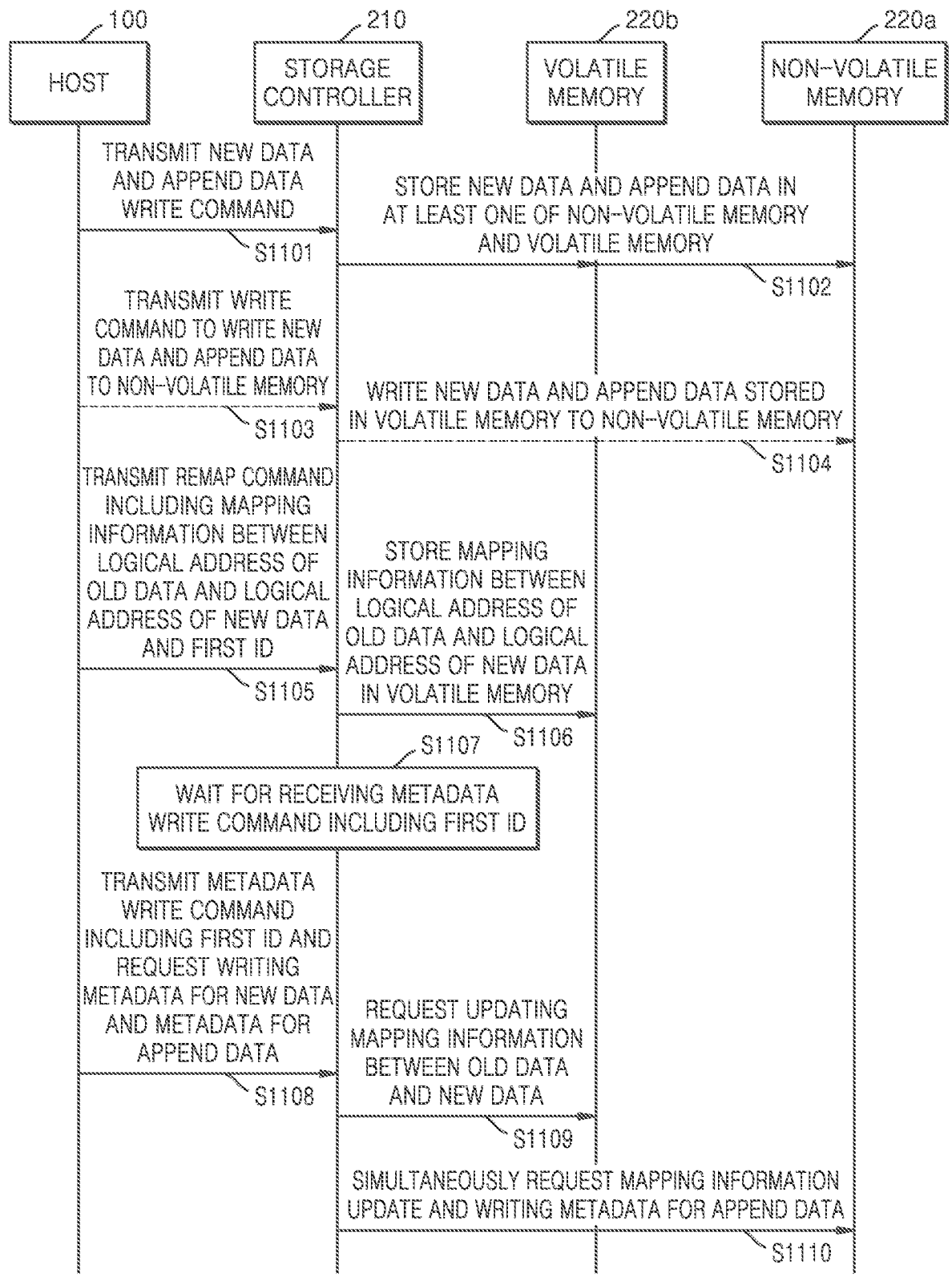
FIG. 11 is a flowchart of the operations of a host and a storage device, according to an embodiment.

FIG. 11 is a flowchart of the operations of the host 100 and the storage device 200, according to an embodiment. FIG. 11 may be described with reference to FIGS. 1 and 2. A redundant description thereof may be omitted.

Referring to FIG. 11, in operation S1101, the host 100 may transmit a new data and append data write command to the storage controller 210.

In operation S1102, the storage controller 210 may store, in response to the new data and append data write command, new data and append data in at least one of the NVM 220*a* and the volatile memory 220*b*. In detail, the storage controller 210 may write part or all of the new data and/or part or all of the append data to at least one of the NVM 220*a* and the volatile memory 220*b*.

In operation S1103, the host 100 may transmit, to the storage controller 210, a flush command to write the new data and the append data to the NVM 220*a*. In operation S1104, the storage controller 210 may write the new data and append data stored in the volatile memory 220*b* to the NVM 220*a*. In detail, the storage controller 210 may write, to the NVM 220*a*, the part or all of the new data and/or part or all of the append data stored in the volatile memory 220*b*.

In operation S1105, the host 100 may transmit, to the storage controller 210, the remap command including the mapping information between the logical address of the old data and the logical address of the new data and the first ID. In operation S1106, the storage controller 210 may store, in the volatile memory 220*b*, the mapping information between the logical address of the old data and the logical address of the new data. In operation S1107, the storage controller 210 may wait for receiving a metadata write command including the first ID.

In operation S1108, the host 100 may transmit, to the storage controller 210, a metadata write command including the first ID and requesting writing metadata for append data. For example, the host 100 may transmit, to the storage controller 210, metadata write command including the first ID and request writing metadata for new data and metadata for append data.

In operation S1109, the storage controller 210 may request, in response to the metadata write command, the volatile memory 220*b* to update the mapping information between the old data and the new data.

In operation S1110, the storage controller 210 may request the volatile memory 220*b* to update the mapping information and simultaneously request the NVM 220*a* to write metadata for the append data.

For convenience of explanation, an example of storing the mapping information between the logical address of the old data and the logical address of the new data in the volatile memory 220*b* located outside the storage controller 210 is described, but the mapping information between the logical address of the old data and the logical address of the new data may be stored in at least one of the RAM 212 and the buffer memory 217 located inside the storage controller 210, and embodiments of the disclosure are not limited to the embodiment described above.

FIG. 12 is a flowchart of the operations of the host 100 and the storage device 200, according to an embodiment. FIG. 12 may be described with reference to FIGS. 1 and 2. A redundant description thereof may be omitted.

Referring to FIG. 12, in operation S1201, the host 100 may transmit a new data and append data write command to the storage device 200.

In operation S1202, the storage device 200 may write new data and append data.

In operation S1203, the host 100 according to an embodiment may transmit, to the storage device 200, a metadata write command for writing metadata of append data and including mapping information between old data and new data.

In operation S1204, the storage device 200 may update the mapping information between old data and new data, and write metadata for the append data, in response to the metadata write command.

For example, the storage device 200 may store a mapping table for matching an LBA of old data and a PPN of new data, by using the mapping information between the logical address of the old data and the logical address of the new data address included in the metadata write command, and simultaneously write metadata for the append data. When the metadata write command includes the mapping information between the logical address of the old data and the logical address of the new data address, the storage device 200 does not need to store the log table. Accordingly, overhead on the mapping information stored in the volatile memory 220b may be reduced.

The host 100 according to another embodiment may transmit, to the storage device 200, a metadata write command for writing metadata of append data and including the mapping information between the logical address of the old data and the logical address of the new data address, and including a request to write the new data and append data stored in the volatile memory 220b to the NVM 220a. In other words, the host 100 may incorporate the flush command and remap command described above into the metadata write command and transmit the metadata write command to the storage device 200.

Figure 13B:
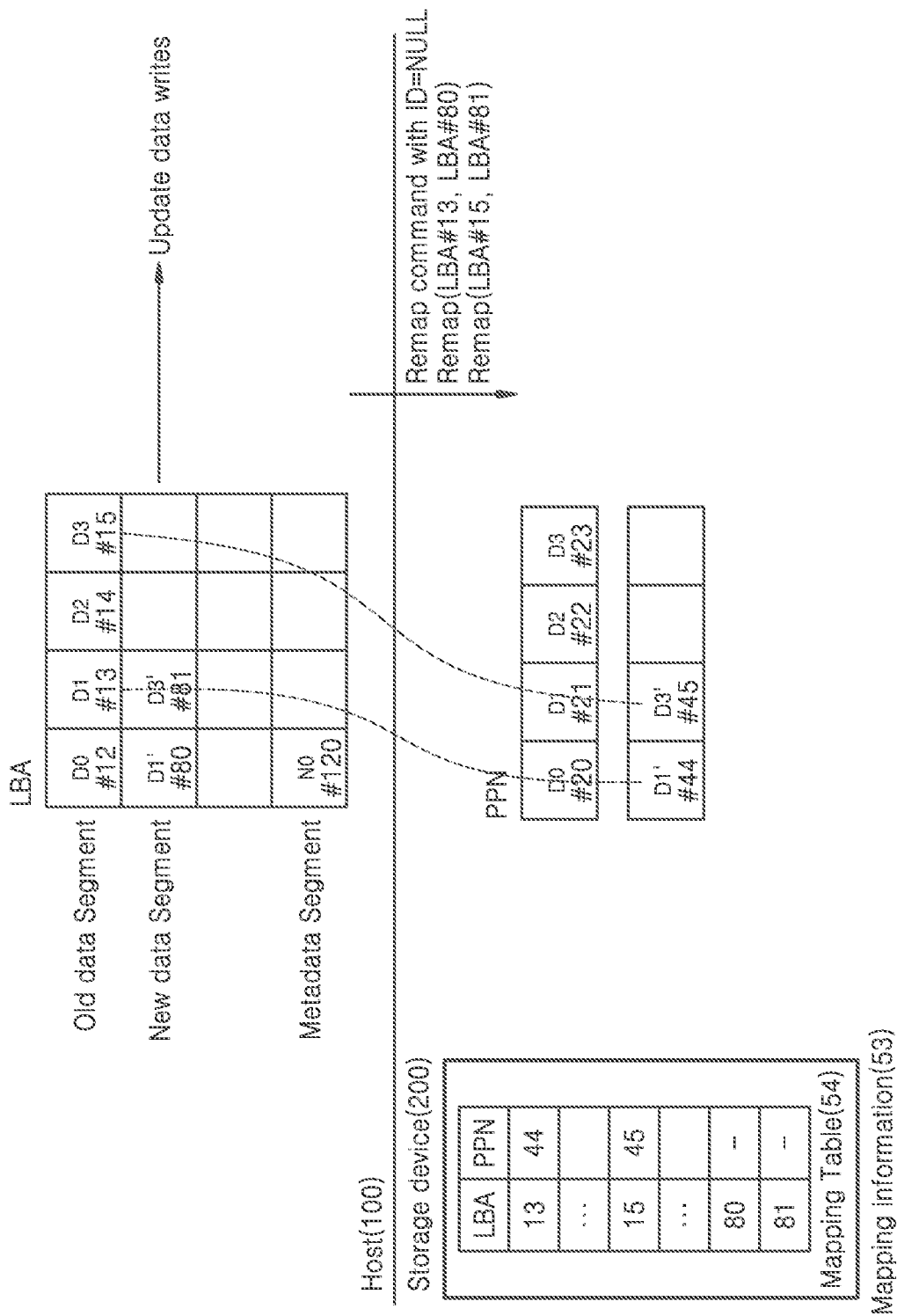

FIGS. 13A and 13B are flowcharts of the operations of the host 100 and the storage device 200, according to an embodiment. FIGS. 13A and 13B may be described with reference to FIGS. 1 and 2. A redundant description thereof may be omitted.

Referring to FIG. 13A, in operation S1301, the host 100 may transmit a new data write command to the storage device 200.

In operation S1302, the storage device 200 may write new data.

Referring to FIGS. 13A and 13B, in operation S1303, the host 100 may transmit a remap command including the mapping information between the logical address of the old data and the logical address of the new data and the first ID=NULL. When the host 100 writes only new data without append data, the ID of the remap command may be set to be NULL.

In operation S1304, the storage device 200 may update, in response to the remap command, the mapping information between the logical address of the old data and the logical address of the new data.

For example, the storage device 200 may match the logical address of the old data with the physical address of the new data by using the mapping information between the logical address of the old data and the logical address of the new data. In detail, the storage device 200 may check the LBA (block #13) of the old data D1 and the PPN (block #20) of the old data D1, and the LBA (block #80) of the new data D1' and the PPN (block #44) of the new data D1'. The storage device 200 may match the LBA (block #13) of the old data D1 with the PPN (block #44) of the new data D1' mapped with the old data D1, by using mapping relationship information between the old data D1 and the new data D1'.

When there is no append data, as the storage device 200 does not need to write metadata for append data, there is no need to adjust an update time of mapping information between old data and new data. Accordingly, when receiving a remap command including that ID is NULL, the storage device 200 may generate mapping information 53 including the mapping table 54 that matches the LBA of old data with the PPN of new data. In this case, the storage device 200 may not generate a log table (shown in FIG. 8 by strike-through of log table entries).

FIG. 14 is a flowchart of the operations of the host 100 and the storage device 200, according to an embodiment. FIG. 12 may be described with reference to FIGS. 1 and 2. A redundant description thereof may be omitted.

Referring to FIG. 14, in operation S1401, the host 100 may transmit a new data and append data write command to the storage device 200.

In operation S1402, the storage device 200 may write new data and append data in response to the write command.

In operation S1403, the host 100 may transmit, to the storage device 200, a remap command including a second ID, and the remap command including the mapping information between the logical address of the old data and the logical address of the new data and the first ID. The remap command including the second ID may include information about data different from data including in the remap command including the first ID.

In operation S1404, the storage device 200 may store the mapping information between the logical address of the old data and the logical address of the new data and the first ID, and store mapping information included in the remap command including the second ID. For example, the storage controller device receive, from the host, a second remap command including a second ID that is different from the first ID, and, in response to the second remap command including the second ID, store second mapping information included in the second remap command including the second ID in the volatile memory.

In operation S1405, the host 100 may transmit a metadata write command including the first ID and for writing metadata for new data and metadata for append data.

In operation S1406, the storage device 200 may update, in response to the receiving of the metadata write command having the first ID, mapping information between the old data and the new data related to the remap command including the first ID, and write metadata for the append data.

As an example, when receiving the metadata write command having the first ID only, the storage device 200 does not update mapping information between the old data and the new data related to the remap command including the second ID.

As another example, when receiving the metadata write command having the first ID and the metadata write command including the second ID, the storage device 200 may update mapping information between the old data and the new data related to the remap command including the first ID, and write metadata for the append data, and update mapping information between the old data and the new data related to the remap command including the second ID, and write metadata for the append data.

In other words, the host 100 may transmit, to the storage device 200, a plurality of remap commands and metadata write commands. Remap commands each having a separate ID may operate independently, and metadata write commands each having a separate ID may operate independently.

Figure 15:
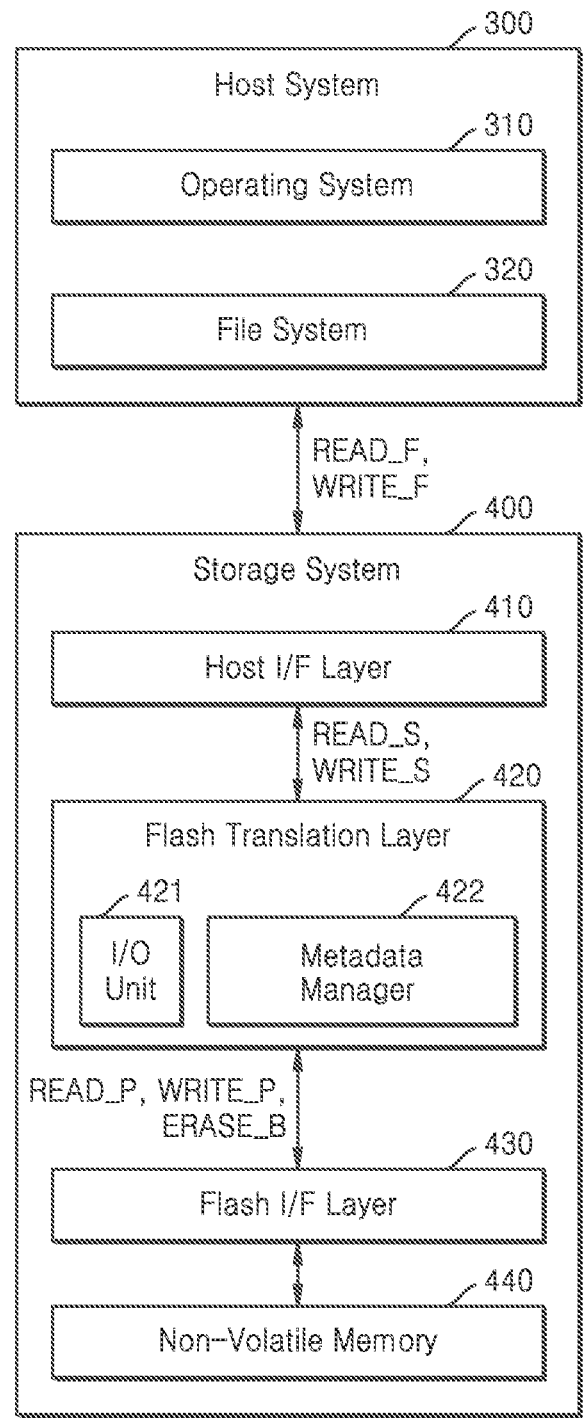
FIG. 15 is a block diagram of a data processing system according to another embodiment.

FIG. 15 is a block diagram of a data processing system according to another embodiment.

Referring to FIG. 15, a host system 300 and a storage system 400 may constitute a memory system 20. As an embodiment, the memory system 20 may constitute a computer, an ultra mobile PC (UMPC), a workstation, a netbook, a personal digital assistant (PDA), a portable computer, a web tablet, a tablet computer, a wireless phone, a mobile phone, a smartphone, an e-book, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage for forming a data center, a device capable of transceiving information in a wireless environment, one of various electronic devices forming a home network, one of various electronic devices forming a computer network, one of various electronic devices forming a telematics network, a radio frequency identification (RFID) device, one of various constituent elements forming a computing system, and the like.

The host system 300 may include at least one operating system 310. The operating system 310 may generally manage and control the function and operation of the host system 300, and provide a mutual operation between a user using the memory system 20 and the host system 300.

The operating system 310 supports functions and operations corresponding to the purpose of use and usage by a user, and for example, may be divided into a general operating system and a mobile operating system according to the mobility of the host system 300. Furthermore, in the operating system, the general operating system may be classified into a personal operating system and an enterprise operating system depending on user's use environment. As an example, the personal operating system is a specialized system to support a service providing function for a general user, and may include Windows, Chrome, and the like, and the enterprise operating system is a specialized system to secure and support high performance, and may include Windows Server, Linux, Unix, and the like.

The mobile operating system in the operating system is a specialized system to support a mobility service providing function and a system power saving function for users, and may include Android, IOS, Windows Mobile, and the like. In an embodiment, the host system 300 may include a plurality of operating systems 310. Furthermore, the memory system 20 performs the operating system 310 to perform an operation with the memory system 20 corresponding to a user request. The host system 300 may transmit a plurality of commands corresponding to the user request to the memory system 20, and accordingly, the memory system 20 may perform operations corresponding to the commands, that is, operations corresponding to the user request.

The host system 300 may include a file system 320. The file system 320 means a material structure to store a filed in the storage system 400 connected to the host system 300.

A read or write request of the host system 300 may be performed in units of files. In other words, through a file read (READ_F) or file write (WRITE_F) request, data from the host system 300 may be stored in the storage system 400, or the data stored in the storage system 400 may be read out by the host system 300.

The storage system 400 may be implemented by, for example, a personal computer (PC), a data server, a network-attached storage (NAS), an Internet of Things (IOT) device, or a portable electronic device. The portable electronic device may include a laptop computer, a mobile phone, a smartphone, a tablet PC, a PDA, an enterprise digital assistant (EDA), a digital steel camera, a digital video camera, an audio device, a PMP, a personal navigation device (PND), an MP3 player, a handheld game console, an e-book), a wearable device, and the like.

The storage system 400 may include a host interface layer 410, a flash translation layer 420, a flash interface layer 430, and a non-volatile memory 440.

The host interface layer 410 may be a logical area where interfacing between the host system 300 and the storage system 400 occurs.

The host interface layer 410 and the flash translation layer 420 may write or read data in units of sectors. The flash translation layer may include an I/O unit 421. In other words, according to a read/write request of the host system 300, the host interface layer 410 may make a read/write request for each sector on the flash translation layer 420.

A metadata manager 422 according to an embodiment may buffer in a cache memory information about the received new data and append data. The metadata manager 422 may update mapping information between old data and new data and update the metadata 218 related to the updated mapping information. The metadata manager 422 may be the metadata manager 214 of FIG. 2, and a redundant description thereof is omitted.

The flash interface layer 430 may provide interfacing between the flash translation layer 420 and the non-volatile memory 440. According to an embodiment, while data read (READ_P) and data write (WRITE_P) may be performed in units of pages, data erasure (ERASE_B) may be performed in units of blocks, which may be characteristics of a flash memory device.

The non-volatile memory 440 may be interpreted as the storage device 200 of FIG. 1, a redundant description thereof is omitted.

The memory system 20 according to the embodiment may be mounted by using various types of packages. For example, the memory system 20 according to the embodiment may be mounted in the form of a package on package (POP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flatpack (TQFP), a mall outline (SOIC), a shrink small outline package (SSOP), a thin small outline (TSOP), a system in package (SIP), a multi chip package, and the like.

Figure 16:
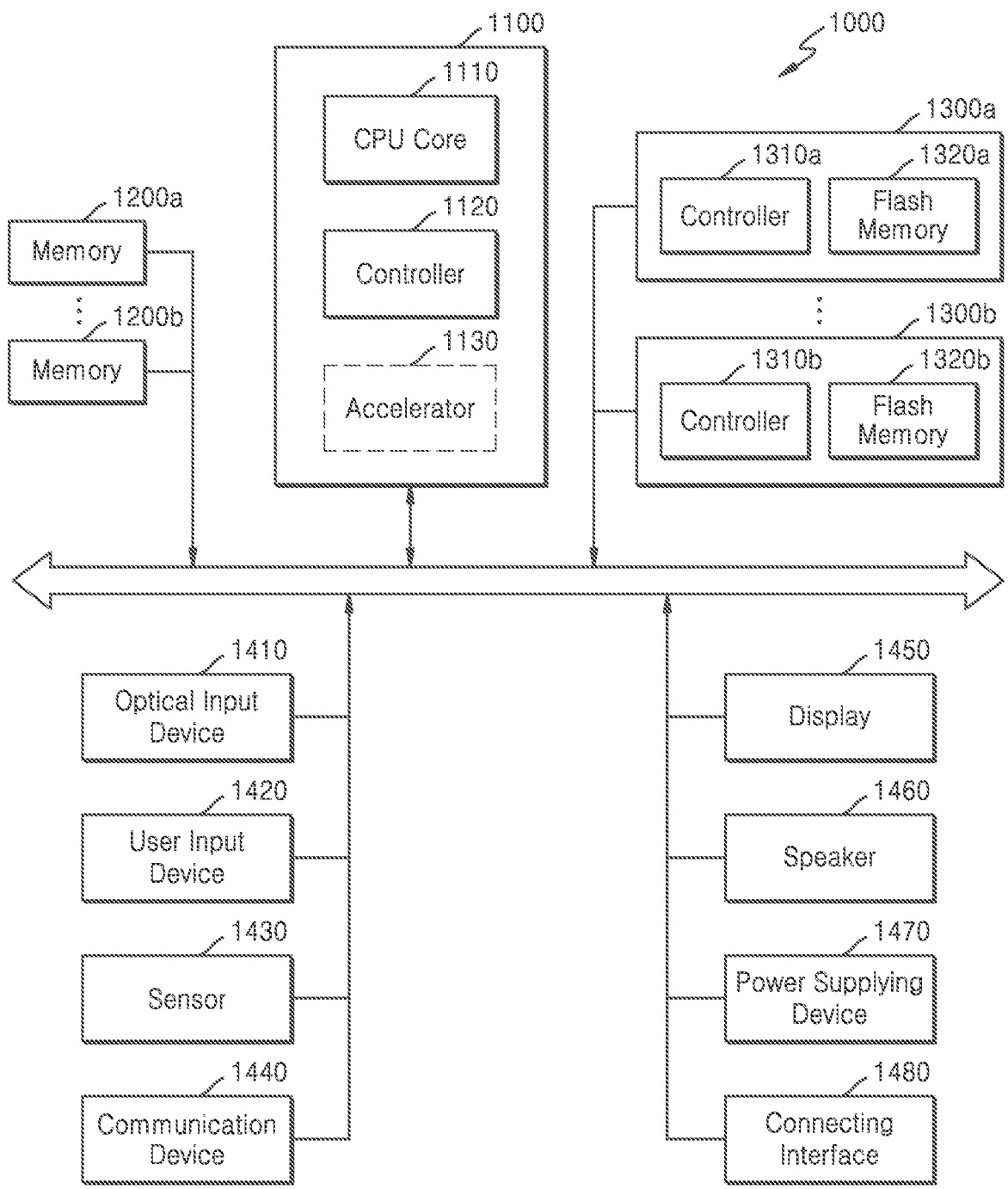
FIG. 16 is a block diagram of a system employing a storage device according to an embodiment.

FIG. 16 is a block diagram of a system 1000 employing a storage device according to an embodiment.

The system 1000 of FIG. 16 may be basically a mobile system, such as a portable communication terminal (mobile phone), a smartphone, a tablet PC, a wearable device, a health care device, or an IOT device. However, the system 1000 of FIG. 10 is not necessarily limited to the mobile system described above, and may be a PC, a laptop computer, a server, a media player, an automotive device such as a navigation device, and the like.

Referring to FIG. 16, the system 1000 may include one or more of a main processor 1100, memories 1200a and 1200b, and storage devices 1300a and 1300b, and additionally, an image capturing device 1410, a user input device 1420, a sensor 1430, a communication device 1440, a display 1450, a speaker 1460, a power supplying device 1470, and a connecting interface 1480.

The main processor 1100 may control an overall operation of the system 1000, in detail, operations of other constituent elements constituting the system 1000. As such, the main processor 1100 may be implemented by a general purpose processor, a dedicated processor, an application processor, and the like.

The main processor 1100 may include one or more CPU cores 1110, and further a controller 1120 to control the memories 1200a and 1200b and/or the storage devices 1300a and 1300b. According to an embodiment, the main processor 1100 may further include an accelerator block 1130 that is a dedicated circuit for a high-speed data operation, such as an artificial intelligence (AI) data operation and the like. The accelerator block 1130 described above may include a graphics processing unit (GPU), a neural processing unit (NPU), a data processing unit (DPU), and/or the like, and may be implemented by a separate chip physically independent of other constituent elements of the main processor 1100.

The main processor 1100 may perform the operation of the host 100 of FIGS. 1 and 2. The main processor 1100 may perform the operation of the host 100 described above in FIGS. 5 to 14.

The memories 1200a and 1200b may be used as main memory devices of the system 1000, and may include a volatile memory, such as SRAM, DRAM, and/or the like, or a non-volatile memory, such as a flash memory, PRAM, RRAM, and/or the like. The memories 1200a and 1200b may be implemented in the same package as that of the main processor 1100.

The storage devices 1300a and 1300b may function as a non-volatile storage device for storing data regardless of power supply, and may have a relatively large capacity compared with the memories 1200a and 1200b. The storage devices 1300a and 1300b may include storage controllers 1310a and 1310b and non-volatile memory (NVM) storages 1320a and 1320b storing data under the control of the storage controllers 1310a and 1310b. The NVM storages 1320a and 1320b may include a V-NAND flash memory having a 2-dimensional (2D) structure or a 3-dimensional (3D) structure, or other types of non-volatile memories, such as PRAM, RRAM, and/or the like.

The storage devices 1300a and 1300b may be included in the system 1000 by being physically separated from the main processor 1100, or may be implemented in the same package as the main processor 1100. Furthermore, as the storage devices 1300a and 1300b have a shape such as a memory card, the storage devices 1300a and 1300b may be detachably coupled to other constituent elements of the system 1000 through an interface such as the connecting interface 1480 to be described below. As such, the storage devices 1300a and 1300b may be devices following the standard protocol such as a UFS, but the disclosure is not necessarily limited thereto.

The storage devices 1300a and 1300b may perform the operation of the storage device 200 described in FIGS. 1 and 2. The storage devices 1300a and 1300b may perform the operation of the storage device 200 described in FIGS. 5 to 14.

The image capturing device 1410 may capture a still image or a video, and may be a camera, a camcorder, a webcam, and/or the like.

A user input device 1420 may receive various types of data input by a user of the system 1000, and may include a touch pad, a key pad, a keyboard, a mouse, a microphone, and/or the like.

A sensor 1430 may detects various types of physical amounts obtainable from the outside of the system 1000, and convert the detected physical amount into electrical signals. The sensor 1430 as above may be a temperature sensor, a pressure sensor, an illuminance sensor, a position sensor, an acceleration sensor, a biosensor, a gyroscope, and/or the like.

A communication device 1440 may perform transmitting and receiving signals with other external devices of the system 1000 according to various communication protocols. The communication device 1440 may be implemented by including an antenna, a transceiver, a modem, and/or the like.

The display 1450 and the speaker 1460 may function as output devices to output visual information and auditory information to the user of the system 1000.

The power supplying device 1470 may appropriately convert and supply power supplied from a battery built into the system 1000 and/or an external power supply, to each constituent element of the system 1000.

The connecting interface 1480 may provide a connection between the system 1000 and an external device connected to the system 1000 and exchange data with the system 1000. The connecting interface 1480 may be implemented by various interface methods, such as Advanced Technology Attachment (ATA), serial ATA (SATA), external SATA (e-SATA), Small Computer Small Interface (SCSI), SAS, Peripheral Component Interconnection (PCI), PCIe, NVM express (NVMe), IEEE 1394, USB, an SD card, a multimedia card (MMC), an eMMC, a UFS, an embedded universal flash storage (eUFS), a CF card interface, and the like.

Figure 17:
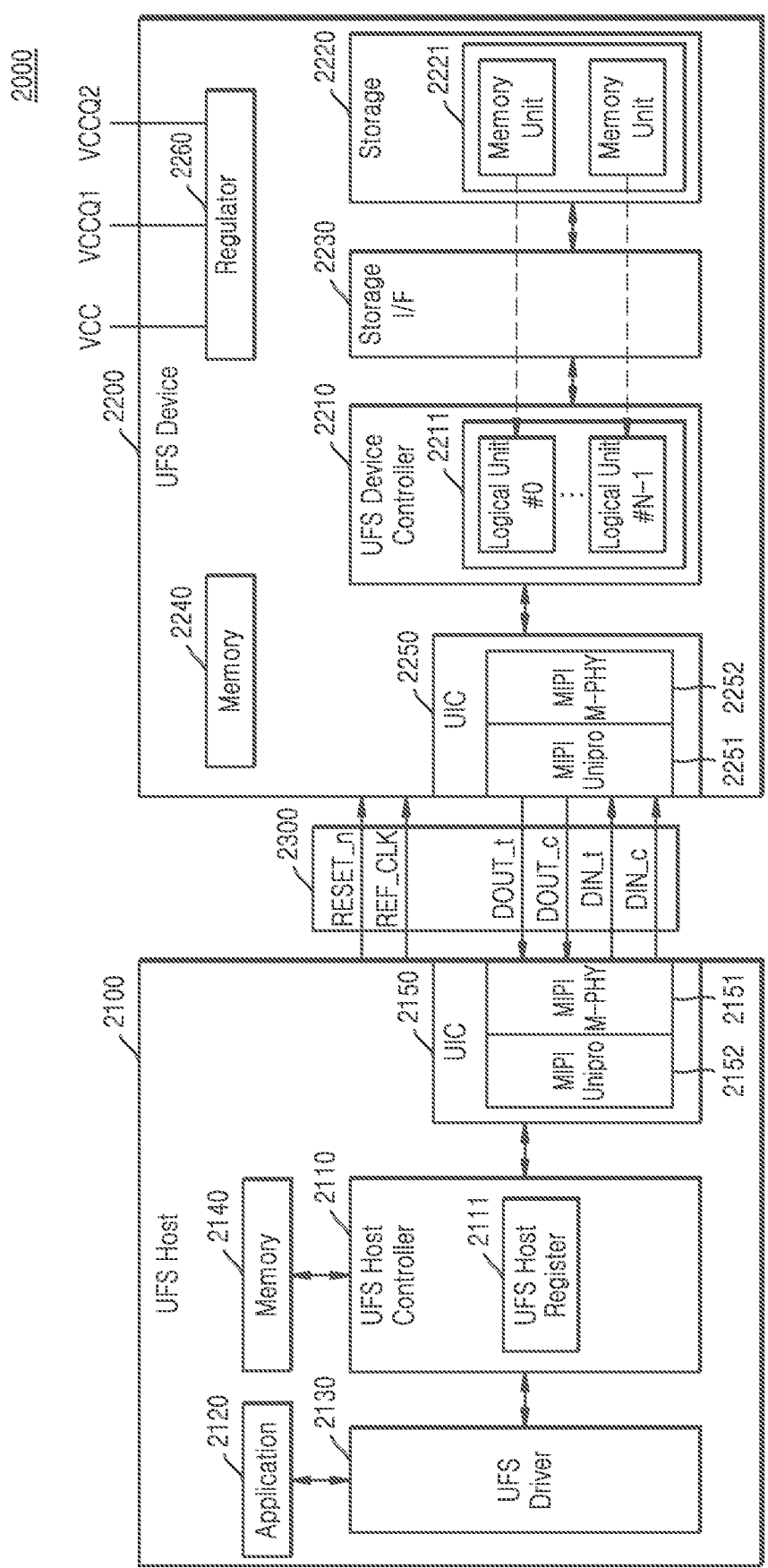
FIG. 17 is a block diagram for describing a universal flash storage (UFS) system according to an embodiment.

FIG. 17 is a block diagram for describing a UFS system 2000 according to an embodiment.

The UFS system 2000 is a system following the UFS standard published by the Joint Electron Device Engineering Council (JEDEC), and may include a UFS host 2100, a UFS device 2200, and a UFS interface 2300. A description of the system 1000 of FIG. 16 described above may also be applied to the UFS system 2000 of FIG. 17 to the extent that it does not conflict with the following description of FIG. 17.

Referring to FIG. 17, the UFS host 2100 and the UFS device 2200 may be connected to each other through the UFS interface 2300. When the main processor 1100 of FIG. 16 is an application processor, the UFS host 2100 may be implemented as a part of the application processor. A UFS host controller 2110 and a host memory 2140 may correspond to the controller 1120 and the memories 1200a and 1200b of the main processor 1100 of FIG. 16, respectively. The UFS device 2200 may correspond to the storage devices 1300a and 1300b of FIG. 16, and a UFS device controller 2210 and a non-volatile storage 2220 may correspond to the storage controllers 1310a and 1310b and the non-volatile storages 1320a and 1320b of FIG. 16, respectively.

The UFS host 2100 may perform the operation of the host 100 of FIGS. 1 and 2, and the UFS device 2200 may perform the operation of the storage device 200 of FIGS. 1 and 2. The UFS host 2100 may perform the operation of the host 100 described above in FIGS. 5 to 14. The UFS device 2200 may perform the operation of the storage device 200 described above in FIGS. 5 to 14.

The UFS host 2100 may include the UFS host controller 2110, an application 2120, a UFS driver 2130, the host memory 2140, and a UFS interconnect (UIC) layer 2150. The UFS device 2200 may include the UFS device controller 2210, the non-volatile storage 2220, a storage interface 2230, a device memory 2240, a UIC layer 2250, and a regulator 2260. The non-volatile storage 2220 may include a plurality of storage units 2221, and the storage units 2221 may include a V-NAND flash memory of a 2D structure or 3D structure, or other types of non-volatile memories such as PRAM, RRAM, and/or the like. The UFS device controller 2210 and the non-volatile storage 2220 may be connected to each other through the storage interface 2230. The storage interface 2230 may be implemented to conform to the standard protocol, such as Toggle or ONFI.

The application 2120 may mean a program capable of communicating with the UFS device 2200 to use the function of the UFS device 2200. The application 2120 may transmit an input/output request (IOR) to the UFS driver 2130 for input/output with respect to the UFS device 2200. The input/output request IOR may mean a data read request, a data write request, a data discard request, and/or the like, but the disclosure is not necessarily limited thereto.

The UFS driver 2130 may manage the UFS host controller 2110 through a host controller interface (UFS-HCI). The UFS driver 2130 may convert an input/output request generated by the application 2120 to a UFS command defined according to the UFS standard, and transmit the converted UFS command to the UFS host controller 2110. One input/output request may be converted to a plurality of UFS commands. The UFS command may be a command basically defined by the SCSI standard, or a UFS standard dedicated command.

The UFS host controller 2110 may transmit the UFS command converted by the UFS driver 2130 to the UIC layer 2250 of the UFS device 2200 through the UIC layer 2150 and the UFS interface 2300. In this process, a UFS host register 2111 of the UFS host controller 2110 may perform a function as a command queue (CQ).

The UIC layer 2150 at the side of the UFS host 2100 may include an MIPI M-PHY 2151 and an MIPI UniPro 2152, and the UIC layer 2250 at the side of the UFS device 2200 may include an MIPI M-PHY 2252 and an MIPI UniPro 2251.

The UFS interface 2300 may include a line for transmitting a reference clock signal REF_CLK, a line for transmitting a hardware reset signal RESET_n for the UFS device 2200, a pair of lines for transmitting a differential input signal pair DIN_t and DIN_c, and a pair of lines for transmitting a differential output signal pair DOUT_t and DOUT_c.

A frequency value of the reference clock signal REF_CLK provided from the UFS host 2100 to the UFS device 2200 may be one of four values of 19.2 MHZ, 26 MHz, 38.4 MHz, and 52 MHz, but embodiments of the disclosure are not limited thereto. The UFS host 2100 may change the frequency value of the reference clock signal REF_CLK even during an operation, that is, data is transceived between the UFS host 2100 and the UFS device 2200. The UFS device 2200 may generate clock signals of various frequencies from the reference clock signal REF_CLK provided by the UFS host 2100, by using a phase-locked loop (PLL) and the like. Furthermore, the UFS host 2100 may set a value of a data rate between the UFS host 2100 and the UFS device 2200 through the frequency value of the reference clock signal REF_CLK. In other words, the value of a data rate may be determined depending on the frequency value of the reference clock signal REF_CLK.

The UFS interface 2300 may support multiple lanes, and each lane may be implemented by a differential pair. For example, the UFS interface 2300 may include one or more receive lanes and one or more transmit lanes. A pair of lines for transmitting a differential input signal pair DIN_t and DIN_c form a receive lane, and a pair of lines for transmitting a differential output signal pair DOUT_t and DOUT_c may form a transmit lane. Although FIG. 17 illustrates one transmit lane and one receive lane, the number of transmit lanes and receive lanes may be changed.

The receive lane and the transmit lane may transmit data by a serial communication method, and a communication by a full-duplex method between the UFS host 2100 and the UFS device 2200 is possible by a structure in which the receive lane is separated from the transmit lane. In other words, while receiving data from the UFS host 2100 through the receive lane, the UFS device 2200 may transmit data to the UFS host 2100 through the transmit lane. Furthermore, control data such as a command from the UFS host 2100 to the UFS device 2200 and user data that the UFS host 2100 desires to store in the non-volatile storage 2220 of the UFS device 2200 or read out from the non-volatile storage 2220 may be transmitted through the same lane. Accordingly, in addition to a pair of receive lanes and a pair of transmit lanes, no separate lane for data transmission is needed between the UFS host 2100 and the UFS device 2200.

The UFS device controller 2210 of the UFS device 2200 may generally control the operation of the UFS device 2200. The UFS device controller 2210 may manage the non-volatile storage 2220 through a logical unit (LU) 2211 that is a logical data storage unit. There may be eight LUs 2211, but embodiments of the disclosure is not limited thereto. The UFS device controller 2210 may include an FTL, and convert a logical data address transmitted from the UFS host 2100, for example, the LBA, to a physical data address, for example, a PBA, by using address mapping information of the FTL. In the UFS system 2000, a logic block for storing user data may have a size of a certain range. For example, the minimum size of a logic block may be set to 4 Kbyte.

The UFS device controller 2210 may correspond to the storage controller 210 of the storage device 200 of FIGS. 1 and 2.

When a command from the UFS host 2100 is input to the UFS device 2200 through the UIC layer 2250, the UFS device controller 2210 may perform an operation according to an input command, and when the operation is complete, may transmit a completion response to the UFS host 2100.

As an example, when the UFS host 2100 attempts to store user data in the UFS device 2200, the UFS host 2100 may transmit a data storing command to the UFS device 2200. When receiving a ready-to-transfer response from the UFS device 2200, the UFS host 2100 may transmit user data to the UFS device 2200. The UFS device controller 2210 may temporarily store the received user data in the device memory 2240, and may store the user data temporarily stored in the device memory 2240 to a selected position of the non-volatile storage 2220, based on the address mapping information of the FTL.

As another example, when the UFS host 2100 attempts to read out user data stored in the UFS device 2200, the UFS host 2100 may transmit a data read command to the UFS device 2200. The UFS device controller 2210 having received the command may read out the user data from the non-volatile storage 2220 based on the data read command, and temporarily store the read user data in the device memory 2240. In the read process, the UFS device controller 2210 may detect and correct an error in the read user data by using a built-in error correction code (ECC) circuit. Then, the UFS device controller 2210 may transmit the user data temporarily stored in the device memory 2240 to the UFS host 2100. In addition, the UFS device controller 2210 may further include an advanced encryption standard (AES) circuit, and the AES circuit may encrypt or decrypt data input to the UFS device controller 2210 by using a symmetric-key algorithm.

The UFS host 2100 may store in order commands to be transmitted to the UFS device 2200 in the UFS host register 2111 serving as a command queue, and transmit in order the commands to the UFS device 2200. In this state, the UFS host 2100 may transmit a next command on the command queue to the UFS device 2200 while a command that is previously transmitted is still processed by the UFS device 2200, that is, before receiving a notice that the previously transmitted command is completely processed by the UFS device 2200. Accordingly, the UFS device 2200 may also receive the next command from the UFS host 2100 while processing the previously transmitted command. The maximum number (queue depth) of commands to be stored in the command queue as above may be, for example, 32. Furthermore, the command queue may be implemented by a circular queue type in which a start and an end of a command string stored in the queue are respectively indicated through a head point and a tail pointer.

Each of the storage units 2221 may include a memory cell array and a control circuit for controlling the operation of the memory cell array. The memory cell array may include a two-dimensional memory cell array or a three-dimensional memory cell array. The memory cell array may include a plurality of memory cells, and each memory cell may be a cell storing 1-bit information, or a single level cell (SLC), or a cell storing 2-bit or more information, such as a multi-level cell (MLC), a triple level cell (TLC), a quadruple level cell (QLC). The three-dimensional memory cell array may include a vertical NAND string in which memory cells are vertically oriented such as at least one memory cell is located above another memory cell.

VCC, VCCQ, VCCQ2, and the like may be input as a power voltage to the UFS device 2200. The VCC, as a main power voltage for the UFS device 2200, may have a value of about 2.4 V to about 3.6 V. The VCCQ, as a power voltage to supply a low range voltage mainly for the UFS device controller 2210, may have a value of about 1.14 V to about 1.26 V. The VCCQ2, as a power voltage to supply a voltage in a range lower than the VCC but higher than the VCCQ mainly for an input/output interface such as the MIPI M-PHY 2252, may have a value of about 1.7 V to about 1.95 V. The power voltages may be supplied to each of constituent elements of the UFS device 2200 via the regulator 2260. The regulator 2260 may be implemented as a set of unit regulators respectively connected to different one of the power voltages described above.

While example embodiments been particularly shown and described, it will be understood that various changes in form and details may be made therein without departing from the spirit and scope of the following claims.

What is claimed is:

1. A storage device comprising:
   a non-volatile memory;
   a volatile memory; and
   a storage controller configured to:
   receive a new data and append data write command from a host,
   write new data and append data to at least one of the non-volatile memory and the volatile memory,
   receive, from the host, a remap command comprising mapping information between old data and the new data and a first identification (ID),
   based on the remap command, store in the volatile memory the mapping information between the old data and the new data and the first ID,
   receive, from the host, a metadata write command requesting writing metadata for the append data and comprising the first ID, and
   based on the metadata write command, update the mapping information between the old data and the new data, and write metadata related to the append data to the non-volatile memory.

2. The storage device of claim 1, wherein the mapping information between the old data and the new data comprises first mapping information between a first logical address of the old data and a second logical address of the new data.

3. The storage device of claim 2, wherein the storage controller is further configured to:
   based on receiving the remap command, check a first physical address of the old data and a second physical address of the new data; and
   store in the volatile memory:
   a mapping table comprising the first logical address and the first physical address of the old data and the second logical address and the second physical address of the new data, and
   a log table comprising the first ID and the first logical address of the old data and the second physical address of the new data.

4. The storage device of claim 3, wherein the mapping information update matches the first logical address of the old data with the second physical address of the new data based on the log table.

5. The storage device of claim 1, wherein the storage controller is further configured to:
   receive, from the host, a flush command to write data stored in the volatile memory to the non-volatile memory, and
   based on the flush command, when there is data stored in the volatile memory, write the data stored in the volatile memory to the non-volatile memory.

6. The storage device of claim 1, wherein the storage controller is further configured to:
   receive, from the host, a flush command to write data stored in the volatile memory to the non-volatile memory and comprising the first ID, and
   based on the flush command, when there is data stored in the volatile memory, write the data stored in the volatile memory to the non-volatile memory.

7. The storage device of claim 1, wherein the storage controller is further configured to:
   receive, from the host, a second remap command comprising a second ID that is different from the first ID,
   based on the second remap command comprising the second ID, store, in the volatile memory, second mapping information included in the second remap command comprising the second ID, and
   based on the metadata write command, not process the second mapping information related to the second ID.

8. The storage device of claim 1, wherein the host comprises a log-structured file system (LFS), and the new data and the append data are entirely written to or not written at all to the storage device.

9. The storage device of claim 8, wherein the LFS comprises a flash-friendly file system (F2FS).

10. The storage device of claim 1, wherein the volatile memory comprises one of static random access memory (SRAM) and dynamic random access memory (DRAM).

11. The storage device of claim 1, wherein the volatile memory comprises static random access memory (SRAM), and the storage controller comprises the volatile memory.

12. The storage device of claim 11, wherein the volatile memory comprises dynamic random access memory (DRAM), and
wherein the DRAM is located outside the storage controller and configured to communicate with the storage controller.

13. An operating method of a storage device communicating with a host and comprising a non-volatile memory and a volatile memory, the operating method comprising:
receiving a new data and append data write command from the host;
writing new data and append data to at least one of the non-volatile memory and the volatile memory;
receiving, from the host, a remap command comprising mapping information between old data and the new data and a first identification (ID);
based on the remap command, storing, in the volatile memory, the mapping information between the old data and the new data and the first ID;
receiving, from the host, a metadata write command requesting writing metadata, wherein the metadata is associated with the append data and the metadata write command comprises the first ID; and
in response to the metadata write command, updating the mapping information between the old data and the new data, and writing the metadata.

14. The operating method of claim 13, wherein the mapping information between the old data and the new data comprises first mapping information between a first logical address of the old data and a second logical address of the new data, and
wherein the storing the mapping information between the old data and the new data and the first ID in the volatile memory comprises:
checking a first physical address of the old data and a second physical address of the new data; and
storing, in the volatile memory, a mapping table comprising the first logical address and the first physical address of the old data and the second logical address and the second physical address of the new data and a log table comprising the first ID and the first logical address of the old data and the second physical address of the new data.

15. The operating method of claim 13, further comprising:
receiving, from the host, a flush command to write data stored in the volatile memory to the non-volatile memory; and
based on the flush command, when there is data stored in the volatile memory, writing the data stored in the volatile memory to the non-volatile memory.

16. The operating method of claim 13, further comprising:
receiving, from the host, a flush command to write data stored in the volatile memory to the non-volatile memory and comprising the first ID; and
based on the flush command, when there is data stored in the volatile memory, writing the data stored in the volatile memory to the non-volatile memory.

17. The operating method of claim 13, wherein the host comprises a log-structured file system (LFS), and
wherein the new data and the append data are entirely written to or not written at all to the storage device.

18. The operating method of claim 17, wherein the LFS comprises a flash-friendly file system (F2FS).

19. A storage device comprising:
a memory device; and
a storage controller configured to:
receive a new data and append data write command from a host,
based on the write command, write new data and append data to the memory device,
receive, from the host, a remap command comprising mapping information between old data and the new data and a first identification (ID),
based on the remap command, store the mapping information between the old data and the new data and the first ID in a memory inside the storage controller,
receive, from the host, a metadata write command requesting writing metadata, wherein the metadata is associated with the append data and the metadata write command comprises the first ID, and
based on the metadata write command, update the mapping information between the old data and the new data, and write the metadata to the memory device.

20. The storage device of claim 19, wherein the host comprises a log-structured file system (LFS), and
wherein the new data and the append data are entirely written to or not written at all to the memory device.

* * * * *